United States Patent
Koike et al.

(10) Patent No.: US 6,181,805 B1
(45) Date of Patent: Jan. 30, 2001

(54) OBJECT IMAGE DETECTING METHOD AND SYSTEM

(75) Inventors: Hideki Koike; Satoshi Shimada, both of Yokosuka; Akira Tomono, Zushi; Kenichiro Ishii; Toshiki Iso, both of Yokosuka, all of (JP)

(73) Assignee: Nippon Telegraph & Telephone Corporation, Tokyo (JP)

(*) Notice: Under 35 U.S.C. 154(b), the term of this patent shall be extended for 0 days.

(21) Appl. No.: 08/288,194

(22) Filed: Aug. 9, 1994

(30) Foreign Application Priority Data

Aug. 11, 1993 (JP) .................................................. 5-219011
Oct. 13, 1993 (JP) .................................................. 5-278912
Mar. 9, 1994 (JP) .................................................. 6-038005

(51) Int. Cl.[7] ............................................................. G06K 9/00
(52) U.S. Cl. ..................................................................... 382/118
(58) Field of Search ................................... 382/117, 118, 382/216

(56) References Cited

U.S. PATENT DOCUMENTS

| | | | |
|---|---|---|---|
| 3,805,238 | * 4/1974 | Rothfjell | 382/118 |
| 4,021,778 | * 5/1977 | Ueda et al. | 382/216 |
| 4,486,775 | * 12/1984 | Catlow | 358/106 |
| 4,754,487 | * 6/1988 | Newmuis | 382/118 |
| 5,008,946 | * 4/1991 | Ando | 382/117 |
| 5,012,522 | * 4/1991 | Lambert | 382/118 |
| 5,046,109 | * 9/1991 | Fujimori et al. | 382/216 |
| 5,164,992 | * 11/1992 | Turk et al. | 382/118 |
| 5,410,609 | * 4/1995 | Kado et al. | 382/118 |

* cited by examiner

Primary Examiner—Andrew W. Johns
(74) Attorney, Agent, or Firm—Pollock, Vande Sande & Amernick, R.L.L.P.

(57) ABSTRACT

In a dictionary image generating section, images of objects each belonging to any one of L categories are taken by a camera from predetermined M directions, a matching region of the object to be recognized is extracted from each of the object images, and dictionary images (N=L×M, n=1, 2, ..., N) which are the representatives of combinations of direction and category are generated and stored together with the directions of the objects. When a test image is given, the degree of similarity r(n, X, Y) between an n-th dictionary image and the image region at the matching position (X, Y) in the test image is computed by a matching section. This matching process is repeated with the matching position (X, Y) and the number n of the dictionary image being varied, and the matching position $(X_{max}, Y_{max})$ where the degree of similarity r(n) becomes the highest is detected.

16 Claims, 17 Drawing Sheets

| CATEGORY | FEATURE SERIES |
|---|---|
| 1 | $f_{1,1}, \quad f_{1,2}, - - - - - , f_{1,M}$ |
| 2 | $f_{2,1}, \quad f_{2,2}, \qquad\qquad , f_{2,M}$ |
| ⋮ | ⋮ |
| i | $f_{i,1}, \quad f_{i,2}, - - - - - , f_{i,M}$ |
| ⋮ | ⋮ |
| L | $f_{L,1}, \quad f_{L,2}, - - - - - , f_{L,M}$ |

OBJECT IMAGE DETECTING METHOD AND SYSTEM

BACKGROUND OF THE INVENTION

This invention relates to an object image detecting method in which an image of an object having features, such as a human face, is taken by a camera from an arbitrary direction and the image thus taken is matched to dictionary or library images previously generated and stored whereby a region of the object in the image is detected, and relates to a method of determining which category the object in the detected object region belongs to among predetermined categories such as human faces classified into corresponding categories and previously registered as well as detecting whether the object in the detected object region belongs to a predetermined category or not and also relates to a system using that method.

There may be a case where it is needed, for example, to automatically identify persons who wish to enter or exit from a particular room, buiding or area so that only predetermined particular persons such as employees or customers are to be permitted to enter or exit therefrom. Also, there may be a case where it is required to discriminate a doubtful or suspicious character or characters from among a great number of unspecified people who enter or exit from a bank or intend to do so. In such cases, it has been proposed to take pictures of people who enter or exit from a particular place or area or intend to do so by a camera and to identify or determine the faces of the people from the images thereof taken.

A prior art apparatus for extracting the object region in the image thereof is based on a thresholding of intensity and/or color information. For example, when a facial region of a person is extracted from the image thereof, intensity and/or saturation and/or hue corresponding to the skin are obtained to set a threshold for detecting the skin region thereby extracting the skin region from the whole image. Alternatively, there is a method of extracting the object region by modeling the shape of the object and fitting it with the edge of the image.

Another prior art object identifying apparatus is provided with a dictionary or library of facial images in a particular direction of a person or persons to be identified such as the direct frontal faces thereof, the side faces thereof or the like and matches a test image inputted thereinto to the facial images of the dictionary whereby the person is identified (see, for example, Ashoc Samal, Prasana A. Iyengar: "Automatic recognition and analysis of human faces and facial expressions" Pattern recognition, Vol. 25, No. 1, pp65–77, 1992).

The prior art object extracting apparatus using thresholding mentioned above is needed to set the optimum threshold. This optimum threshold may often vary with the direction or orientation of the object. Therefore, if the direction or orientation of the object is unknown, it is difficult to set the optimum threshold for extracting the object region. Also, the prior art method of fitting a modeled shape of the object with the edge of the image cannot extract the object region with high accuracy if the shape of the object in its image varies with the direction or orientation of the object, or the edge representing the contour or outline of the object cannot be extracted correctly from the image due to occlusion of a portion of the object or shadow of the object.

Further, the prior art object identifying apparatus is required to input the image (e.g., the direct frontal face) taken from the same direction as that from which the image prepared and stored in the dictionary is taken, and therefore has a limited scope to which the appratus is applied since it is necessary to limit the direction from which the object is taken by any procedure or means.

SUMMARY OF THE INVENTION

An object of the present invention is to provide an object image detecting method and system which are capable of detecting the object region of the image by use of high speed processing and stably without depending on the direction from which the object is taken, and to provide a method and system which can detect which category the object belongs to among various predetermined categories (for example, registered faces of people, children's faces, adult female faces, adult male faces or the like), and to provide a method and system which are able to detect whether the object detected belongs to a predetermined category or not.

In accordance with the present invention, images of an object or objects belonging to either one of a predetermined number of categories (L kinds) to be recognized are previously taken by a camera or cameras from a plurality of predetermined M directions, and a region (matching region) of the object to be recognized is extracted from each image, and N dictionary images (N=M×L) representative of the directions and categories are generated from the images, and the dictionary images are stored in dictionary image generating means together with the directions or orientations of the object (the directions from which the object is taken, namely, the directions of the camera). When a test image of an object to be analyzed is given, the degree of similarity or resemblance r(n, X, Y) to the n-th dictionary image (n=1, 2, . . . , N) at a matching position (X, Y) in the test image is computed by matching means, and this matching process is performed with (X, Y) and n varied, and the position $(X_{max}, Y_{max})$ where the degree of similarity r(n, X, Y) thereof becomes the highest is outputted as a region corresponding to the object region.

According to the object region detecting method and system of the present invention, if the number M of the directions of the dictionary images representative of the objects belonging to the categories (L kinds) to be recognized is properly set in the dictionary image generating means, even though test images including objects to be recognized which look in different directions are provided, the position of the matching region of the test image where the degree of similarity between the matching region of the test image and the dictionary image becomes the highest accords with the position of the object to be recognized so that the dictionary image at that time can be determined to represent the category to which the object to be recognized belongs. Thus, it is possible to extract the matching region so as to include the object to be recognized without depending on the direction or orientation of the object to be recognized in the test image.

DETAILED DESCRIPTION OF THE PREFERRED EMBODIMENTS

In the various embodiments illustrated herein the present invention will be described with respect to the application in which children's faces (i=1), adult female faces (i=2) and adult male faces (i=3) are selected as categories of reference objects, facial regions are selected as regions to be extracted, and three points, e.g., left and right eyes and mouth are selected as K feature points within each of the facial regions. It is to be understood, however, that this invention is also applicable to recognition of objects other than human faces.

Figure 1:
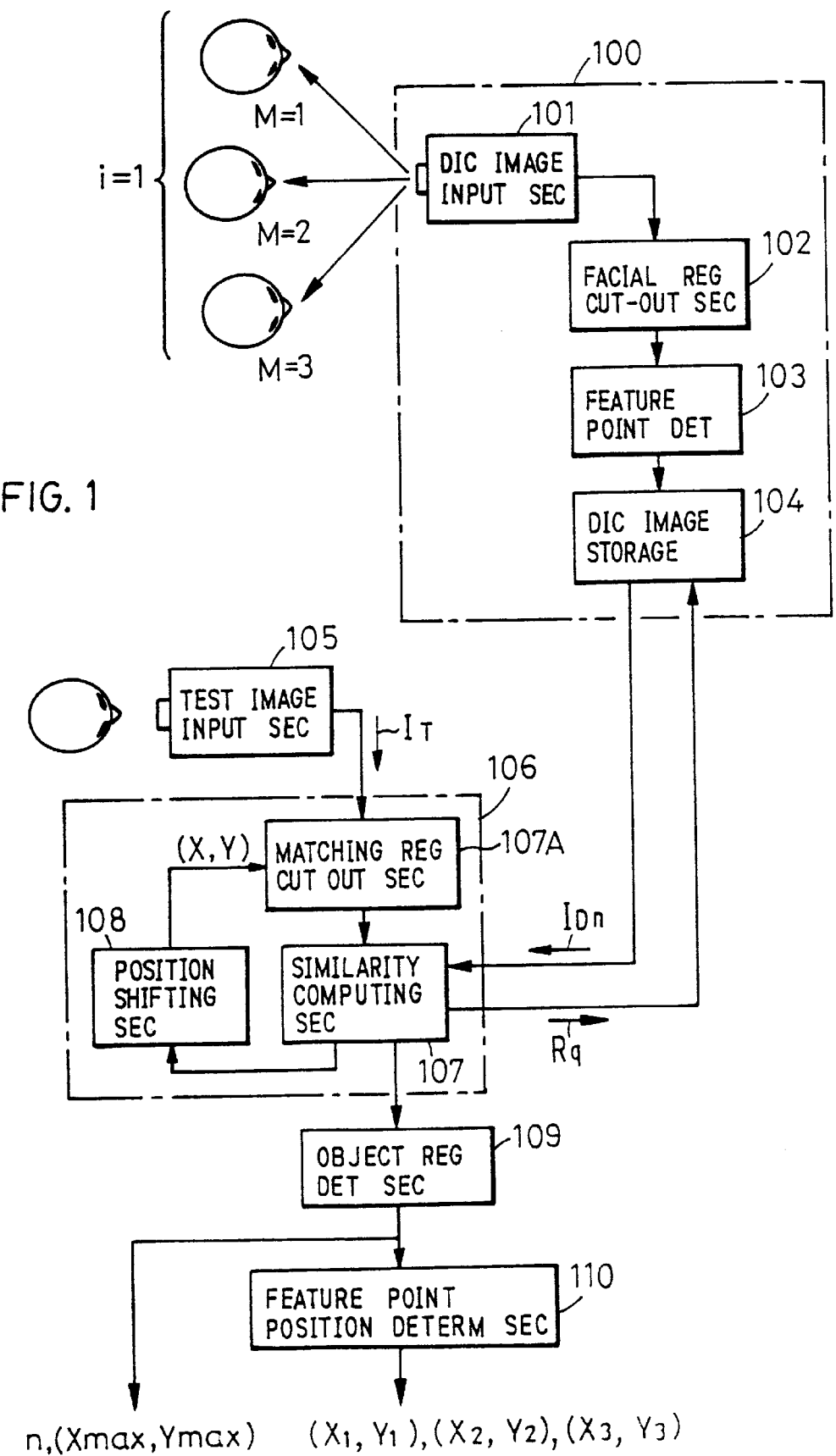
FIG. 1 is a functional block diagram showing a first embodiment of the present invention.

FIG. 1 is a functional block diagram illustrating the process and construction of a first embodiment of the system according to present invention. Referring to FIG. 1, a dictionary or library image generating section 100 is shown which comprises a dictionary or library image input section 101, a facial region cut-out section 102, a feature point detecting section 103 and a dictionary or library image storage 104.

The dictionary image input section 101 comprises a camera which is adapted to take facial images in M directions or orientations of each of P persons each belonging to any one of the categories i=1, 2, 3 and output the captured or acquired images to the facial region cut-out section 102.

The facial region cut-out section 102 has an image buffer for holding an image of one frame and is adapted to cut a facial region out of the received image and output it as an image of only the facial region of a predetermined fixed size. As it is a process for generating a dictionary or library image in the application herein discussed, it will be practically no problem if the region cutting operation is manually carried out.

The feature point detecting section 103 serves to detect predetermined feature points which are predetermined feature items such as the eyes and mouth from the facial image received from the facial region cut-out section 102 and provide the positions or locations of the feature points along with the facial image to the dictionary image storage 104. Again, this feature point detecting operation, being a process for generating a dictionary image in the application herein discussed, may be manually effected with no practical problem involved. The function of the dictionary image storage 104 is to generate dictionary images from the positions of the feature points and the facial images received from the feature point detecting section 103 and store the dictionary images.

Figure 2:
FIG. 2 is an illustration of images stored in a dictionary image storage 104 of FIG. 1.

The generation of dictionary images may be accomplished by taking the facial images in predetermined M directions of each of P persons each belonging to any one of the categories, conforming or adjusting the sizes and positions of the facial regions of the P facial images in each direction with one another by the use of their positions of the eyes and mouth, and thereafter averaging them. Alternatively, P×M facial images may be divided into M clusters for each of the categories and, supposing that each of the images consisting of a×b pixels and an image is represented by an a×b dimensional vector (which will be called "image vector") having all of the pixels as components thereof, then either the centroid which is the centroidal vector of all the image vectors within each of the clusters or the image vector (facial image) closest to the centroid may be determined as a dictionary image. In this way, a dictionary may be obtained which contains typical facial images for each of the categories i=1, 2, . . . , L as viewed from M directions with the corresponding coordinates $(x_f, y_1)$, $(x_2, y_2)$, $(x_3, y_3)$ of the three feature points within the respective images, as illustrated in FIG. 2, for example. In FIG. 2 the coordinates of these feature points are indicated by $(x_f, y_f)$. Upon receiving a dictionary image read-out request from a matching section 106, the dictionary image storage 104 reads out a dictionary image stored therein and outputs it.

A test image input section 105 comprising a camera takes an image to be analyzed and outputs the captured image to the matching section 106 as a test image $I_T$. The matching section 106 comprises a matching region cut-out section 107A, a similarity computing section 107 and a position shifting section 108.

Figure 3:
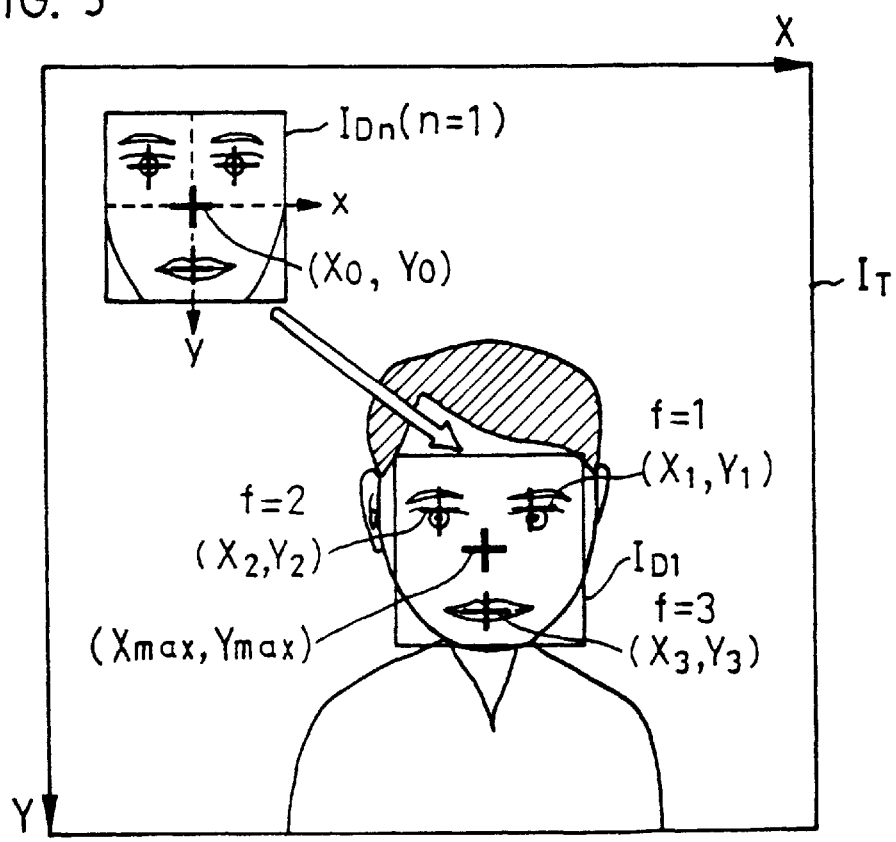
FIG. 3 is an illustration for explaining a matching process of FIG. 1.

The matching region cut-out section 107A has an image buffer for holding an image of one frame. Upon receiving a test image $I_T$ from the test image input section 105, it functions to cut out of the test image a matching region image having a predetermined size based on a matching position initial value $(X_0, Y_0)$ designated by the position shifting section 108 and provides the matching region image to the similarity computing section 107. Upon receiving the matching region image, the similarity computing section 107 provides a readout request $R_q$ to the dictionary image storage 104 to read out dictionary images. In response to the request $R_q$ by the similarity computing section 107 the dictionary image storage 104 is operable to successively read out N dictionary images $I_{Dn}$ (n=1, 2, . . . , N) together with the feature point positions $(X_f, y_f)$ as shown in FIG. 2 and outputs them to the similarity computing section 107, which in turn computes the degrees of similarity or resemblance r (n, $X_0$, $Y_0$) (where n=1, 2, . . . , N) between the matching region of the test image and the N dictionary images to provide information on the computed similarity degrees to an object region detecting section 109 while at the same time sending an instruction to update the matching position to the position shifting section 108. FIG. 3 illustrates how the similarity can be computed between the matching region of the test image $I_T$ and the n-th dictionary image $I_{Dn}$ (n=1) at the matching position $(X_0, Y_0)$.

Upon receiving an updated matching position (X, Y) from the position shifting section 108, the matching region cut-out section 107A is operable to cut a matching region having a predetermined size based on the updated matching position out of the test image. Then in the manner as described above, the similarity computing section 107 computes the degrees of similarity r (n, X, Y) between the cut-out matching region of the test image and the dictionary images for output to the object region detecting section 109 while at the same time outputting a matching position updating instruction to the position shifting section 108. The foregoing operations are repeated until the matching position (X, Y) arrives at a preset final position $(X_m, Y_m)$, whereupon the processing by the matching section 106 is terminated, and the process proceeds to the object region detecting section 109. By way of example, the similarity computation in the similarity computing section 107 may be accomplished by utilizing coefficients of correlation between two images.

Upon receipt of a matching position updating instruction from the similarity computing section 107, the position shifting section 108 shifts either one or both of the previous matching position coordinates X, Y by predetermined step sizes $\Delta X$ and/or $\Delta Y$, and outputs the shifted position to the similarity computing section 107 as new matching position coordinates (X, Y). The position shifting may be carried out as by raster scanning the test image. Specifically, the coordinate X is moved incrementally by step $\Delta X$ to scan the test image from $X_0$ to $X_m$ respectively while the coordinate Y is advanced by step $\Delta Y$ each time the coordinate X reaches X. whereby the coordinate Y is moved from $Y_0$ to $Y_m$.

The object region detecting section 109 detects the matching position $(X_{max}, Y_{max})$ and the dictionary image $I_{Dn}$ where the degree of similarity r (n, $X_0$, $Y_0$) received from the similarity computing section 107 is maximal, and outputs them to a feature point position determining section 110.

The feature point position determining section 110 superposes the dictionary image $I_{Dn}$ received from the object region detecting section 109 on the region around the matching position $(X_{max}, Y_{max})$ within the test image, whereby the positions of the eyes $(X_1, Y_1)=(X_{max}+x_1, Y_{max}+y_1)$, $(X_2, Y_2)=(X_{max}+x_2, Y_{max}+y_2)$ and the position of the mouth $(X_3, Y_3)=(X_{max}+x_3, Y_{max}+y_3)$ within the test image are determined from the positions of eyes and mouth $(x_1, y_1), (x_2, y_2), (x_3, y_3)$ which are the feature point positions $(x_f, y_f)$ stored in the dictionary image.

When the updated matching position (X, Y) in the position shifting section 108 reaches the preset final matching position coordinates $(X_m, Y_m)$, the matching process is terminated, followed by processing by the object region detecting section 109 which detects the highest value of the received similarity degrees r (n, X, Y), and outputs to the feature point position determining section 110 the matching position $(X_{max}, Y_{max})$, the number n of the dictionary image $I_{Dn}$ and the feature point positions $(x_f, y_f)$ of the dictionary image when the highest similarity degree is found. The position $(X_{max}, Y_{max})$ where the degree of similarity is maximal is shown in FIG. 3. In this manner the feature point position determining section 110 determines the positions of the eyes and mouth within the test image based on the informations n, $(X_{max}, Y_{max})$, $(x_1, y_1)$ received from the object region detecting section 109. In FIG. 3, the positions of the eyes and mouth are represented by:

$(X_1, Y_1)=(X_{max}+x_1, Y_{max}+y_1)$,
$(X_2, Y_2)=(X_{max}+x_2, Y_{max}+y_2)$, and
$(X_3, Y_3)=(X_{max}+x_3, Y_{max}+y_3)$, respectively.

The coordinates of these feature points in the test image are represented by $(X_f, Y_f)$; f=1,2,3.

With regard to M directions or poses of the object in the dictionary image, the greater the number M of directions, the more enhanced is the ability to accommodate to the directions of an object image in a test image $I_T$. It is to be understood, however, that an increase in the number of directions would require an increased storage capacity of the dictionary image storage 104 necessary to store dictionary images as well as a longer time for the matching section 106 to accomplish the process.

Figure 4:
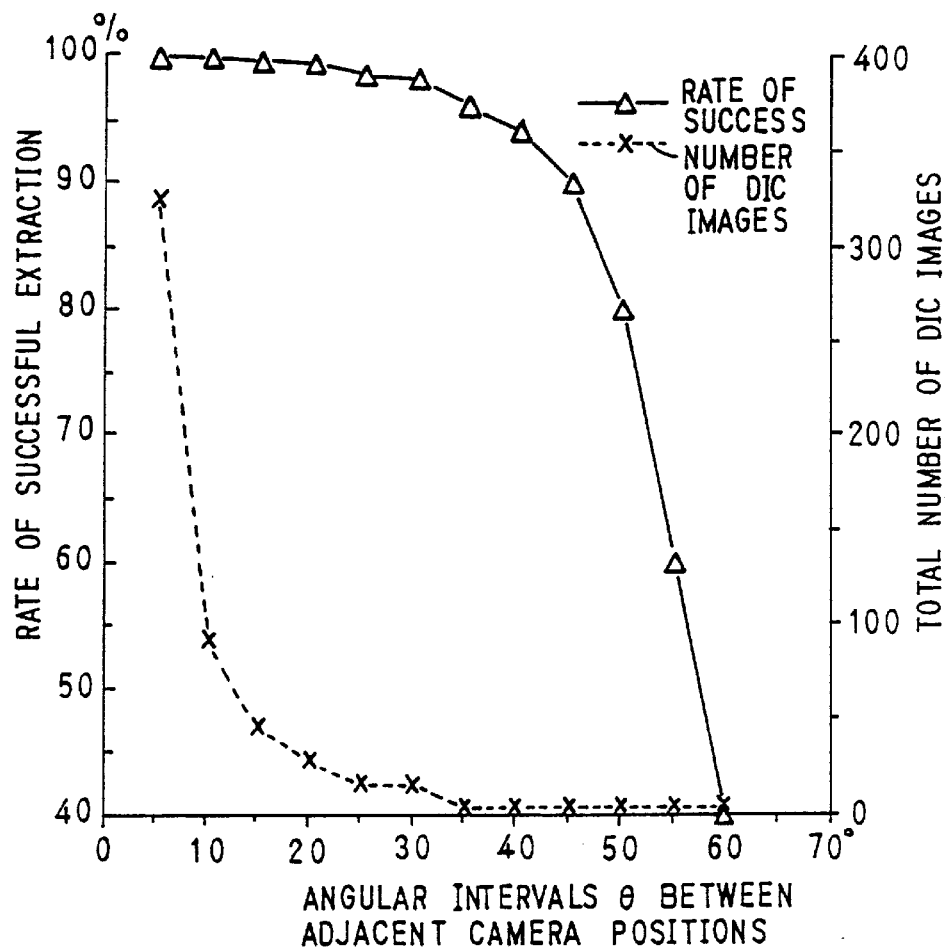
FIG. 4 is a graph showing the relation between angular intervals between adjacent camera positions and rate of successful extractions.
Figure 5A:
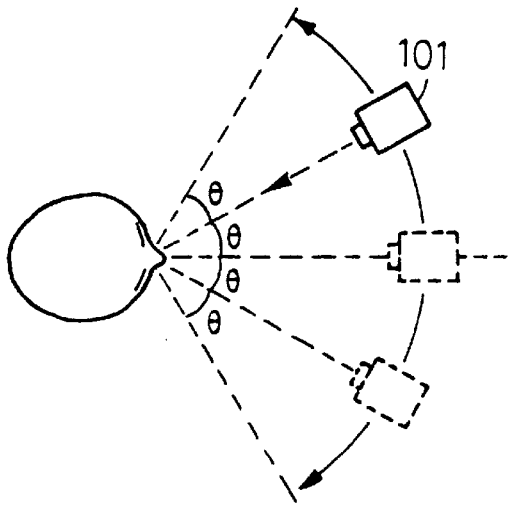
FIGS. 5A and 5B are illustrations for explaining angular intervals between adjacent camera positions, respectively.
Figure 5B:
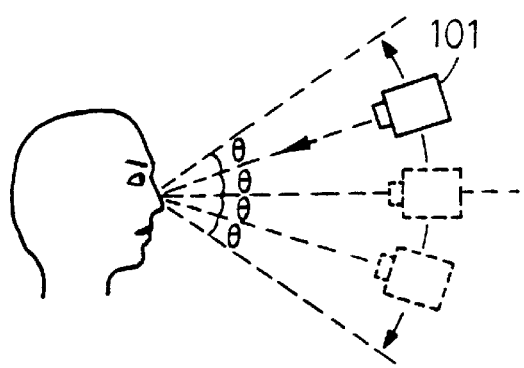

FIG. 4 is a graph showing the results of an experiment on extracting facial regions from test images. In this experiment, a dictionary of facial images was prepared by taking images or pictures of the faces of ten persons within the range of 60° in the left and right rotational directions, respectively, from the direct front view of the face and the range of 30° in the up and down rotational directions, respectively, therefrom and by varying the camera position about the face at intervals of 0 degrees (in this example θ=5, 10, 15, 20, 25, 30, 35, 40, 45, 50, 55 and 60 degrees in the left/right rotational direction and θ=5, 10, 15, 20, 25 and 30 degrees in the up/down rotational direction), as illustrated in FIGS. 5A and 5B, and thereafter by averaging those images for each direction to generate a dictionary image.

For test images, 450 images were taken of the faces of ten persons other than the people used to prepare the dictionary. Specifically, the test images were taken per person at 45 different angles selected from the range of 60° in the left and right rotational directions and the range of 30° in the up and down rotational directions from the direct front view of the face. θ is an angle by which the camera is rotated from one position to an adjacent next position and is hereinafter referred to as "angular interval between adjacent camera positions". In FIG. 4, the ordinate represents the rate of successful extractions for the marks Δ and the total number of dictionary images for the marks X; while the abscissa indicates the angular intervals θ. It is seen from the graph that the total number of dictionary images sharply increases when the angular interval θ is smaller than 10° whereas the accuracy of extracting the facial region drops when the angular interval θ exceeds 40°.

It is to be appreciated from this example that in one embodiment of this invention M images for each of the categories may be captured at angular intervals θ selected such that they are equal to or greater than 10° and less than 40°. These images together with the feature point coordinates $(x_f, y_f)$ may be stored as a dictionary of images in the dictionary image storage 104, whereby it is possible to extract object regions at a high rate of success with a smaller number N of dictionary images, that is, at a higher speed and a higher accuracy.

As is described above, according to this invention, it is possible to extract a facial region in an image regardless of the direction or orientation of the face and detect the positions of the eyes and mouth as feature points.

Figure 6:
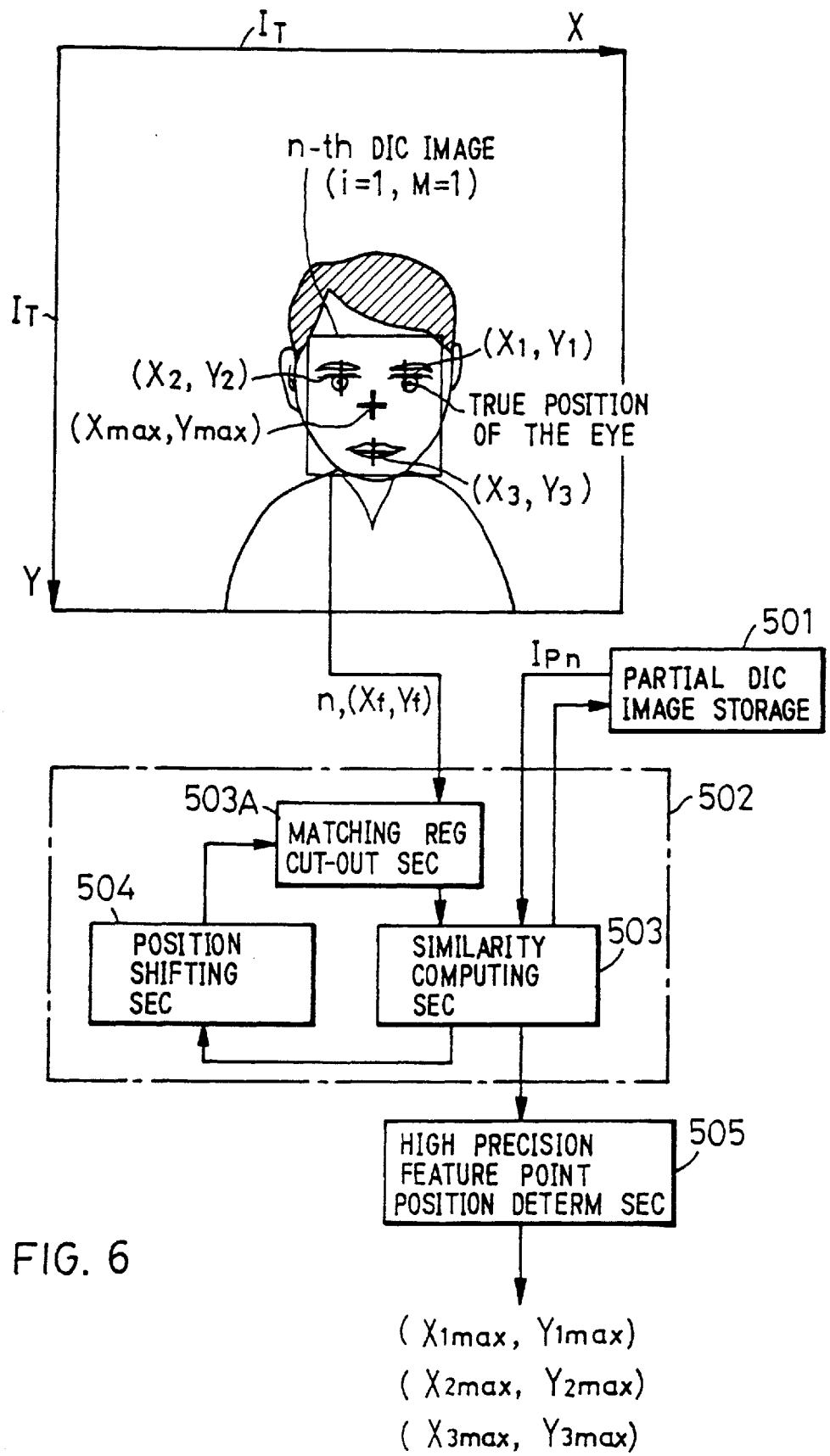
FIG. 6 is a functional block diagram showing a second embodiment of the present invention.

FIG. 6 is a functional block diagram illustrating the process and construction of a second embodiment of the system according to the present invention. FIG. 6, however, depicts diagrammatically that the input test image represented by a block $I_T$, the feature point coordinates $(x_f, y_f)$, f=1, 2, 3 determined from the matching position $(X_{max}, Y_{max})$ exhibiting the highest similarity degree in the embodiment of FIG. 1, and the number n of the dictionary image $I_{Dn}$ when the highest similarity degree is found are inputted to a partial matching section 502. The partial matching section 502 comprises a matching region cut-out section 503A, a similarity computing section 503 and a position shifting section 504, all of which operate in the manner similar to the matching region cut-out section 107A, similarity computing section 107 and position shifting section 108 of the matching section 106 in FIG. 1.

Figure 7:
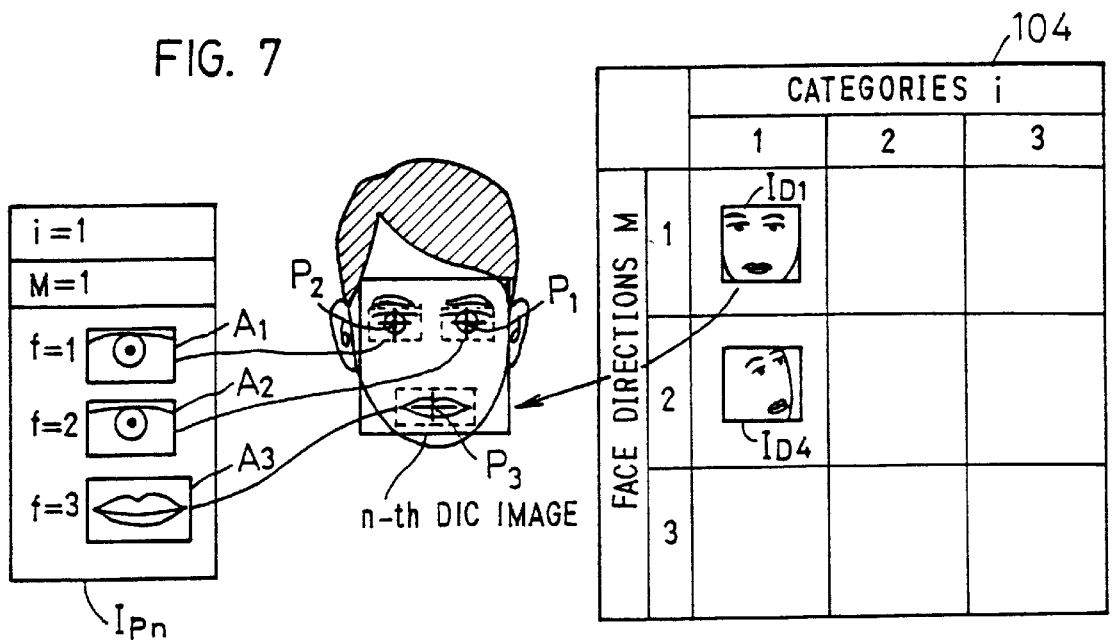
FIG. 7 is an illustration for explaining generation of a partial dictionary image.

In the embodiment of FIG. 6, a set of partial region images $A_1$, $A_2$, $A_3$ of a predetermined size including the feature point coordinates $(x_f, y_f)$ of the eyes and mouth in correspondence to each of the dictionary facial images $I_{Dn}$ of L categories and M directions stored in the image storage 104 in FIG. 1 are stored as a partial dictionary image $I_{Pn}$ in a partial dictionary image storage 501 as shown in FIG. 7.

Figure 8:
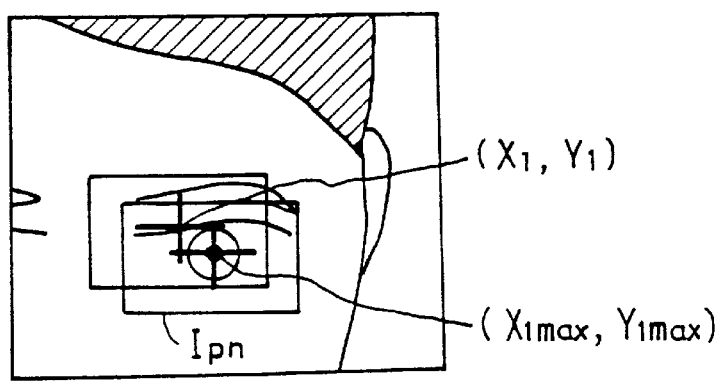
FIG. 8 is an illustration for explaining a partial matching process.

Upon being provided with the number n of the dictionary image exhibiting the highest degree of similarity to the test image obtained by the matching process as described with respect to FIG. 1 and the eye positions $(X_1, Y_1)$, $(X_2, Y_2)$ and the mouth position $(X_3, Y_3)$ which are the feature point positions $(X_f, Y_f)$ in the test image, the partial matching section 502 requests the partial dictionary image storage 501 to read out a partial dictionary image $I_{Pn}$ corresponding to n-th dictionary image $I_{Dn}$ and receives the partial dictionary image $I_{Pn}$. With regard to the feature points f(=1, 2, 3) such as the eyes and mouth, partial matching section 502 alters the matching position (X, Y) successively within a preset area around the position $(X_f, Y_f)$ (FIG. 8 shows the case in which f=1 as an example) to compute the similarity degree $r_f(n, X, Y)$ between the test image and the partial dictionary image in the same manner as described with respect to the matching section 106 in FIG. 1, and outputs the computed similarity degree to a high precision feature point position determining section 505. The high precision feature point position determining section 505 determines the matching positions $(X_{fmax}, Y_{fmax})$ in the test image exhibiting the highest value or score of similarity for each of the feature points f=1, 2, 3, and further computes the feature point positions $(X_{fmax}+x_f, Y_{fmax}+y_f)$ in the test image for each of the feature points f=1, 2, 3 on the basis of the matching positions and the feature points $(x_f, y_f)$ in the dictionary image.

It is thus to be understood that according to this embodiment of the invention, it is possible to extract the positions of the feature points such as the eyes and mouth with a higher accuracy in a test image through the process of matching against partial dictionary images carrying partial regions around the eyes and mouth.

Figure 9:
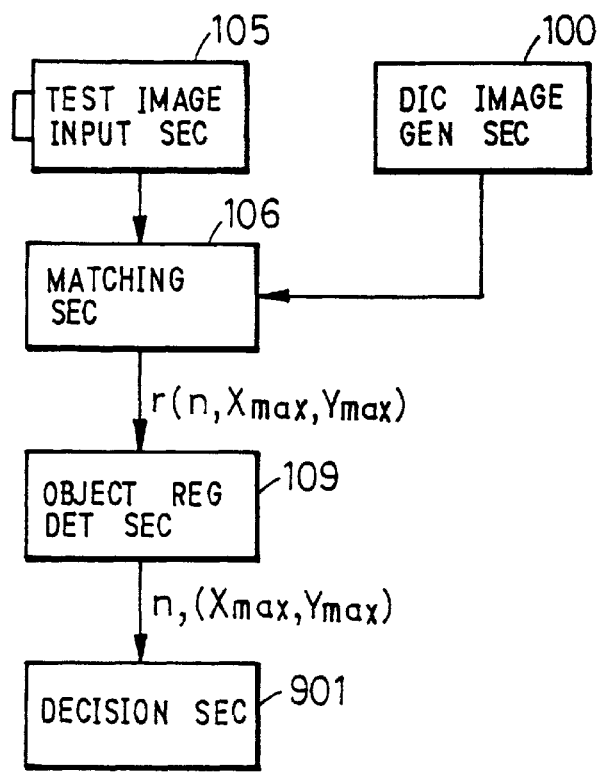
FIG. 9 is a functional block diagram showing a third embodiment of the present invention.

FIG. 9 shows another embodiment of the present invention in which, in addition to the system of FIG. 1, a decision section 901 is provided to determine or discriminate the category to which the image of an object region extracted from a test image belongs. In this embodiment, however, the feature point position determining section 110 used in the embodiment of FIG. 1 is not required.

Upon detecting the matching position $(X_{max}, Y_{max})$ where the test image shows the highest score of similarity to the dictionary image in the manner described with respect to FIG. 1, the object region detecting section 109 outputs the position $(X_{max}, Y_{max})$ and the number n of the dictionary image $I_{Dn}$ at that time to the decision section 901. Based on the similarity degree r $(n, X_{max}, Y_{max})$ between the partial region in the test image and the n-th dictionary image $I_{Dn}$ at the matching position $(X_{max}, Y_{max})$ as received from the object region detecting section 109, the decision section 901 decides which of the categories i=1, 2, . . . , L of the object of the dictionary image the object within the test image belongs to, and outputs the decision result.

Figure 10A:
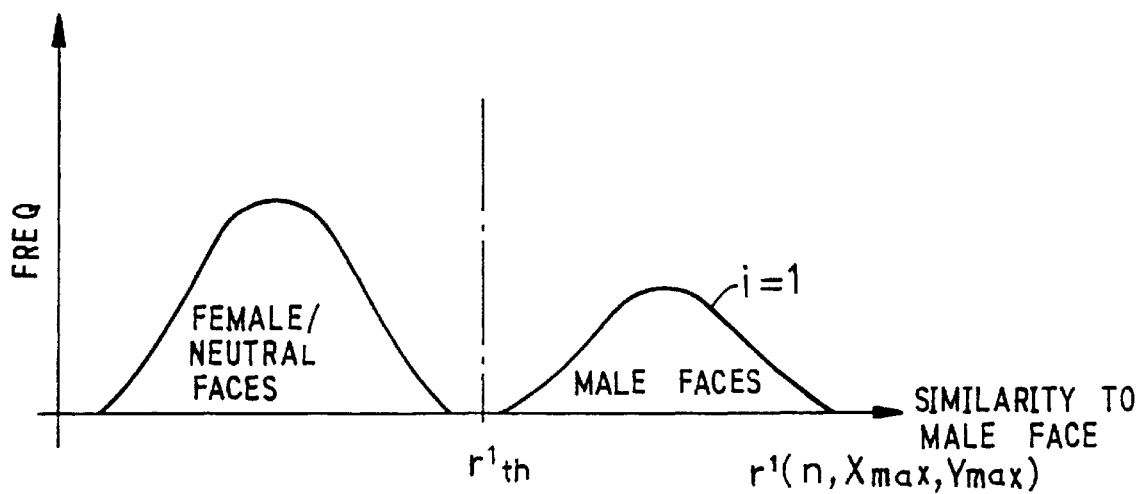
FIGS. 10A–10D are graphs showing similarity degree distribution of images in respective categories, respectively.
Figure 10B:
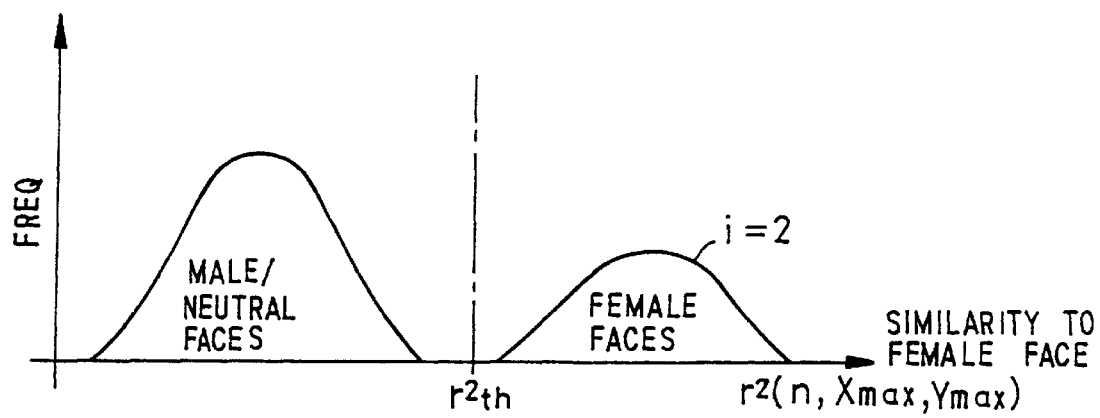
Figure 10C:
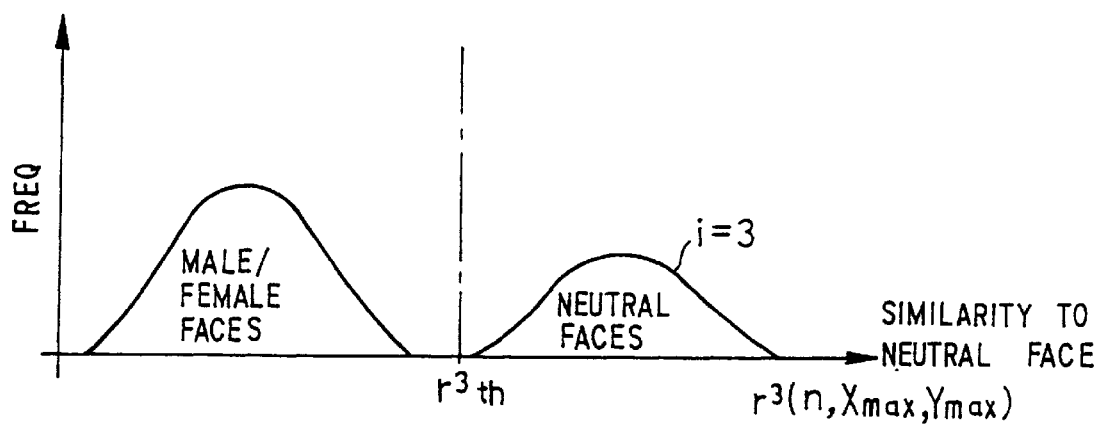

Taking the case that an object contained in a test image is a human face, the processing by the decision section 901 will be described as to how to verify which male face (i=1), female face (i=2) and neutral face (i=3) the human face is the closest to. In this case, if the number L of categories is 3 and the number of directions or orientations for each category is M, the total number of dictionary images will be 3M. By way of example, the matching process as described in FIG. 1 is performed on a number of test images including facial images which are known to belong to any one of the three categories to obtain the highest scores of similarity $r^i(n, X_{max}, Y_{max})$ between each of the test images and all of the dictionary images of each of the categories. The degrees of similarity of all the test images are classified by the matching categories i=1, 2, 3, and the distribution (frequency) of the test images versus the similarity degrees is obtained for each category i, the results of which are shown in FIGS. 10A, 10B and 10C. It is seen that in any of the categories, there are obtained two hill or mountain-like distribution curves each having a peak, one in the range greater than and the other in the range smaller than the similarity degree $r^1_{th}$, $r^2_{th}$ or $r^3_{th}$. This means that when the input test image is matched against the category i=1 (that is, male face), for instance, it may be decided that the face of the test image is male if the similarity degree is greater than the threshold $r^1_{th}$. If the similarity degree is less than the threshold $r^1_{th}$, it may be decided that the face of the test image is other than male, that is, female or neutral. Generally, when the condition that the similarity $r^i(n, X_{max}, Y_{max}) > r^i_{th}$ is satisfied in matching against the category i, it may be decided that the face of the input test image belongs to the category i. It may thus be decided which of the categories the input test image belongs to or that it belongs to none of the categories, by comparing against the threshold $r^i_{th}$ for each of the categories i.

According to this embodiment, it is possible to decide which of the pre-registered categories the object belongs to regardless of the direction of the object.

Figure 10D:
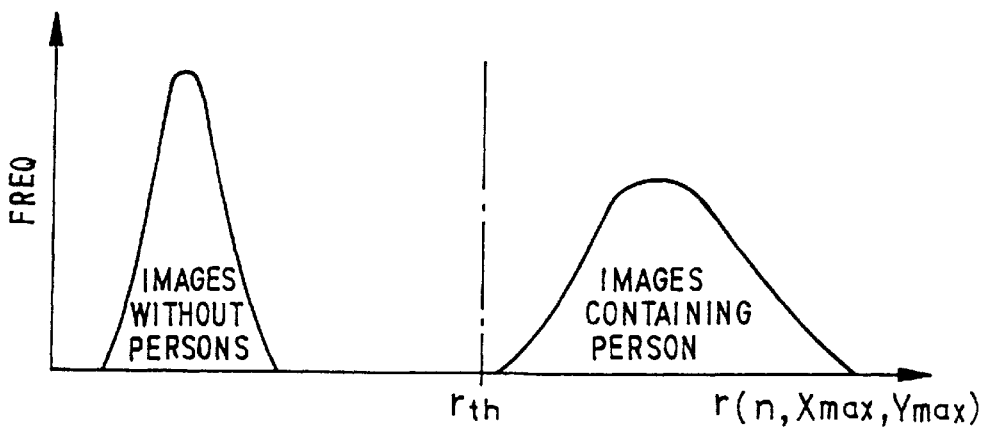

In a special case to which the embodiment of FIG. 9 is applicable, if it is needed to decide only whether an image of a person is present in the input test image, only one category may be needed for a dictionary of images. In that case, a number of facial images are taken of male and female persons in M directions, and averaged facial images are produced for each of M directions by averaging the facial images in the same direction. Such averaged facial images may be prepared as a dictionary of images. When a number of test images with and without persons are matched against the dictionary of averaged facial images, the distribution of the test images with no person versus the similarity degrees and that of the test images with a person will exhibit two hill-like curves separated from each other as shown in FIG. 10D, so that it can be determined whether a person is present in an input test image by setting a threshold $r_{th1}$ of the similarity degree between the two hill-like curves as shown in FIG. 10D. In this case the feature point detecting section 103 included in the dictionary image generating section 100 may be eliminated. Furthermore, in the embodiment of FIG. 9, the accuracy in the matching and discriminating process may be enhanced if, in generating a dictionary of images, the camera positions at which object images are taken are selected such that the angular intervals between adjacent camera positions in the dictionary images in M directions of each category are equal to or greater than 10° and less than 40°, as described in connection with FIGS. 5A and 5B.

Figure 11:
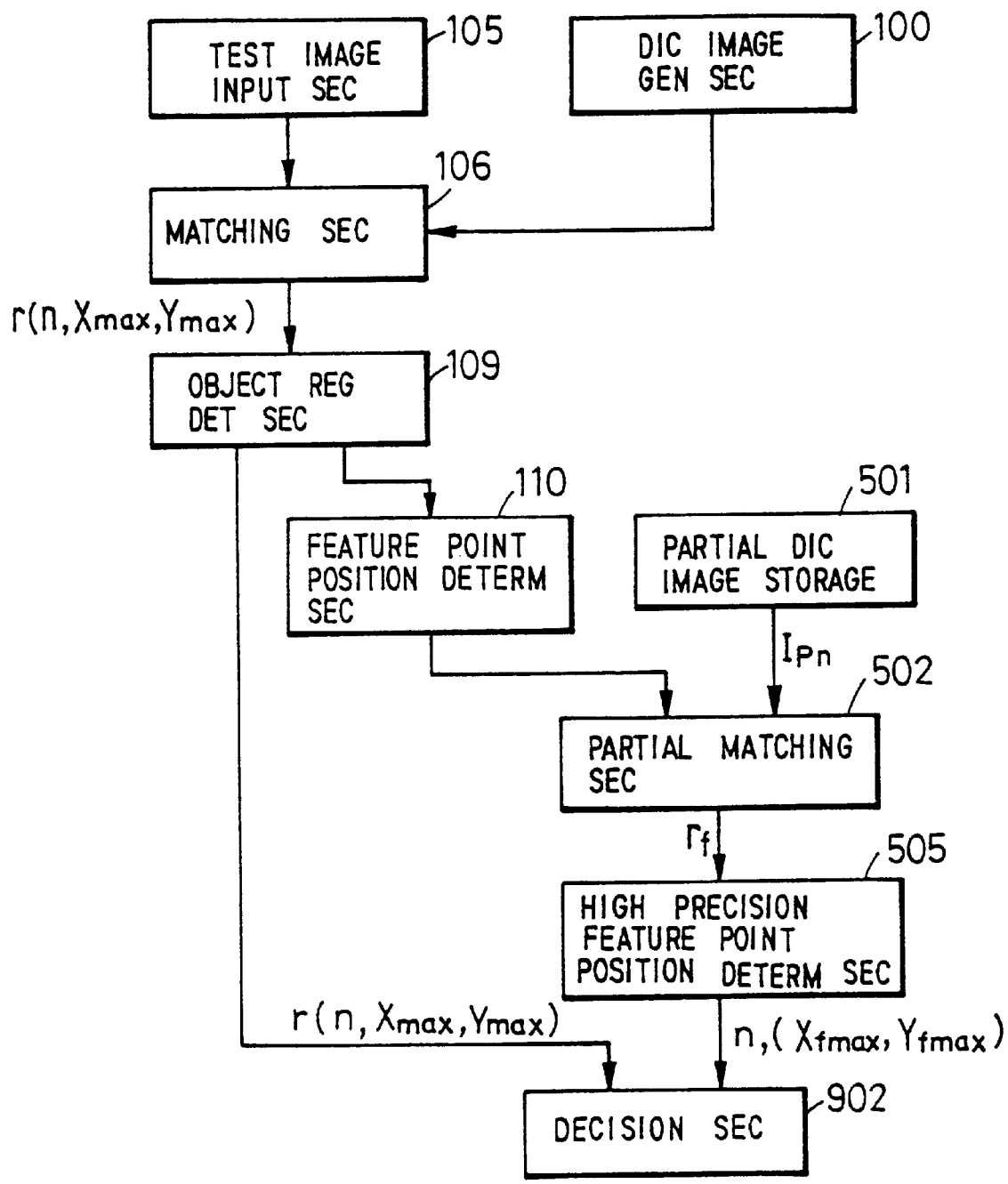
FIG. 11 is a functional block diagram showing a fourth embodiment of the present invention.

FIG. 11 illustrates still another embodiment of the present invention in which the partial matching technique disclosed in the embodiment of FIG. 6 and the technique of determining the category as disclosed in the embodiment of FIG. 9 are combined to provide for determining the category of a partial test image by matching the test image against the partial dictionary images.

In FIG. 11, the dictionary image generating section 100, test image input section 105, matching section 106 and object region detecting section 109 operate in the same manner as the corresponding blocks in FIG. 1, and the feature point position determining section 110, partial dictionary image storage 501, partial matching section 502 and high precision feature point position determining section 505 operate in the same manner as the corresponding blocks in FIG. 6.

As in the embodiment of FIG. 6, the high precision feature point position determining section 505 outputs to a decision section 902 the matching position $(X_{max}, Y_{max})$ where the test image exhibits the closest similarity to the dictionary image and the number n of the dictionary image at that time. Also as in the embodiment of FIG. 6, the high precision feature point position determining section 505 outputs to the decision section 902 the matching position $(X_{fmax}, Y_{fmax})$ where the similarity between the partial dictionary image $I_{Pn}$ and the test image with respect to the feature point f is maximal at that time.

Based on the similarity degree $r(n, X_{max}, Y_{max})$ to the n-th dictionary image at the matching position $(X_{max}, Y_{max})$ as received from the object region detecting section 109, and the similarity degree $r_f(n, X_{fmax}, Y_{fmax})$ to the partial dictionary image $I_{Pn}$ at the position $(X_{fmax}, Y_{fmax})$, the decision section 902 decides which of the categories of the object of the dictionary image the object within the test image belongs to, and outputs the decision result.

Taking the case that an object contained in a test image is a person, the processing by the decision section 902 will be described as to how to verify which of a person with no eyeglasses or spectacles on (category i=1), a person with eyeglasses (category i=2) and a person with sunglasses on (category i=3) the object person is. In this case, the dictionary images stored in the dictionary image storage 104 of the dictionary image generating section 100 are facial images of three categories in M directions.

Figure 12A:
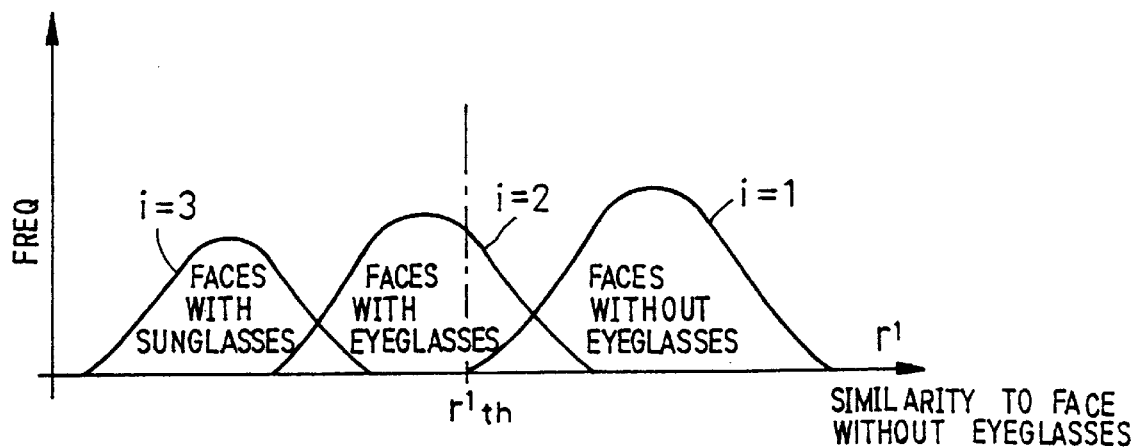
FIGS. 12A–12E are graphs showing similarity degree distribution of images in respective categories, respectively.

FIG. 12A shows the frequency distribution of similarity $r^1(n, X_{max}, Y_{max})$ between facial images in a number of test images which are known to belong to any one of the three categories and the dictionary images of the no eyeglasses category (i=1). It is here to be noted that the degrees of similarity at the peaks of the three hill-like frequency distribution curves represented by the no eyeglasses, eyeglasses and sunglasses categories decrease progressively in the order named and that the skirts of the adjoining hill-like curves intersect each other. Consequently, if a threshold $r^1_{th}$ of the similarity degree is set between the hills of the categories i=1 and i=3 as shown in FIG. 12A, it is possible to decide that the subject person is either a person with no eyeglasses on or a person with eyeglasses on when the similarity $r^1(n, X_{max}, Y_{max})$ is greater than the threshold $r^1_{th}$, but it is impossible to determine which of these two categories the subject person is in. For this reason, partial region images $I_{Pn}$ of eyes corresponding to the images of the category i=1 in various M directions are stored in the partial dictionary image storage 501 in this embodiment.

Figure 12B:
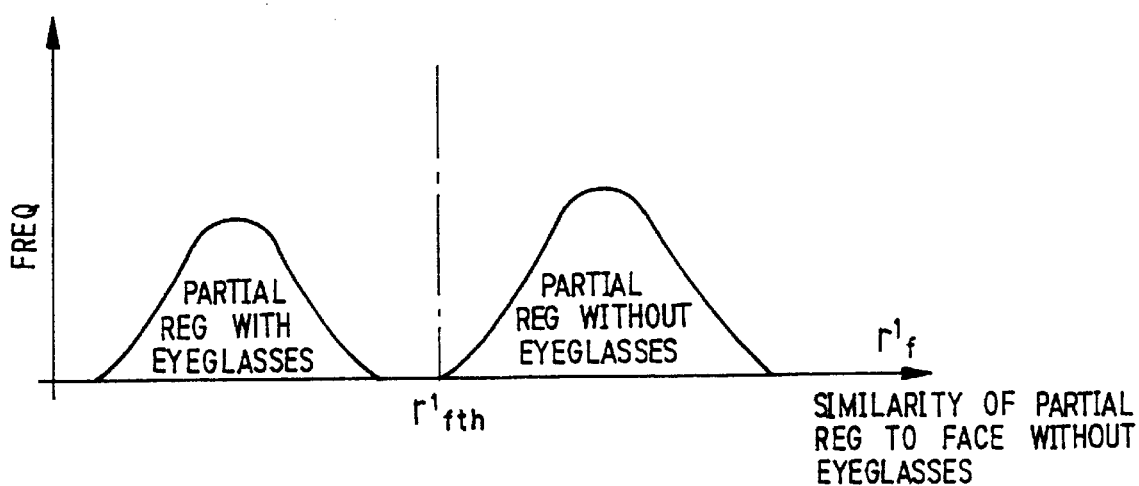
Figure 12C:
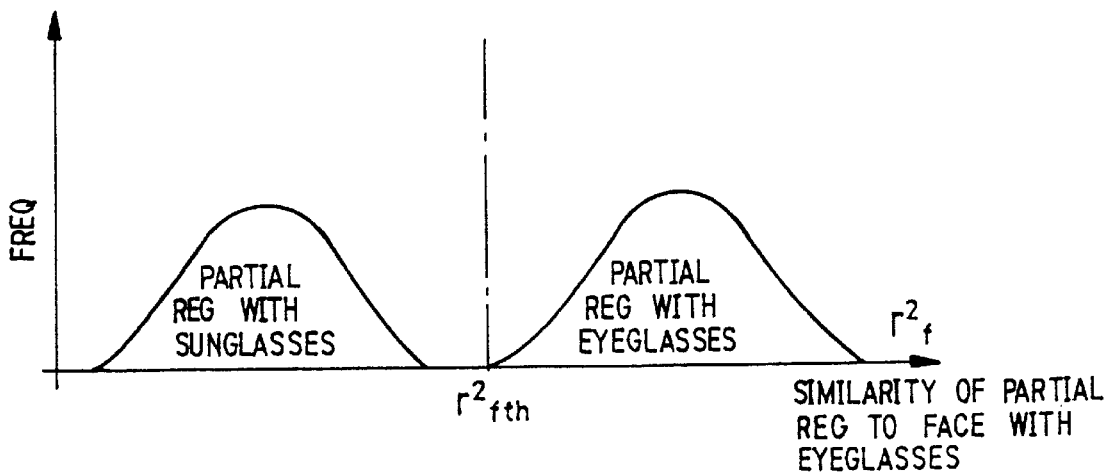

In that case, the frequency distribution of the similarity $r^1_f(n, X_{fmax}, Y_{fmax})$ versus the partial region images of eyes in the dictionary images of persons belonging to the known no eyeglasses category (i=1) is as shown in FIG. 12B. As can be seen from the graph of FIG. 12B, when $r^1_f(n, X_{fmax}, Y_{fmax}) > r^1_{fth}$, it may be decided that the person under test is a person with no eyeglasses on. When $r^1(n, X_{max}, Y_{max}) \leq r^1_{fth}$, it may be decided that the subject person is a person with either eyeglasses or sunglasses on. In that case, the frequency distribution of the similarity $r^2_f(n, X_{fmax}, Y_{fmax})$ versus the partial region images of eyes in the dictionary images of persons belonging to the known eyeglasses category is as shown in FIG. 12C. As can be seen from the graph of FIG. 12C, when $r^2_f(n, X_{fmax}, Y_{fmax}) > r^2_{th}$, it may be decided that the subject person is a person with eyeglasses on.

Figure 12D:
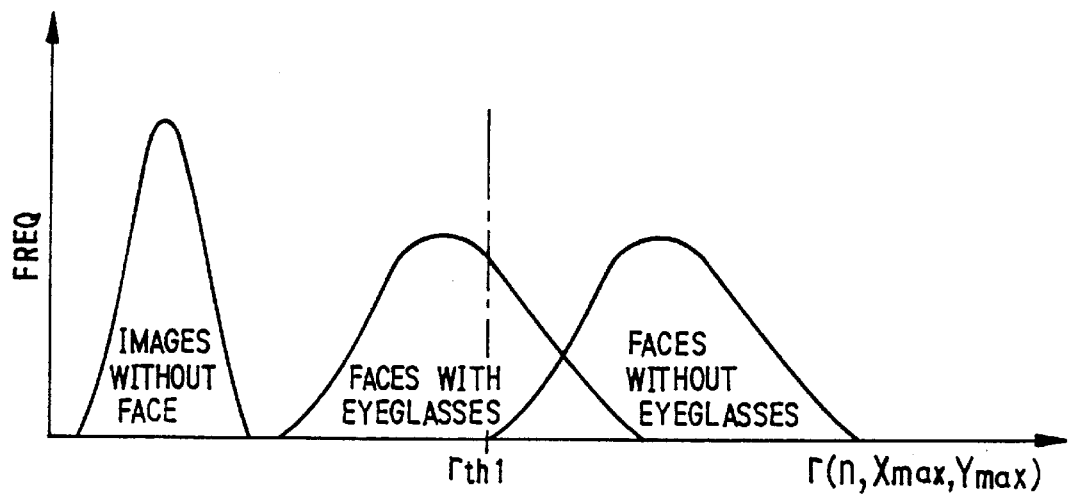

In the embodiment of FIG. 11, if it is desired to determine whether the object within a test image is a person with no eyeglasses on, no eyeglasses facial images of one category in M directions are prepared as dictionary images in the dictionary image generating section 100. When these dictionary images are used to match against test images, the frequency distributions of the similarity degree $r(n, X_{max}, Y_{max})$ in the case (1) that the test images contain no human faces, the case (2) that the test images contain human faces with eyeglasses on, and the case (3) that the test images contain human faces with no eyeglasses on are as shown in FIG. 12D. Thus, based on the similarity degree $r(n, X_{max}, Y_{Max})$ output from the object region detecting section 109, the decision section 902 is capable of deciding from FIG. 12D that the case is either case (2) or (3) listed above, when $r(n, X_{max}, Y_{max}) > r_{th1}$.

Figure 12E:
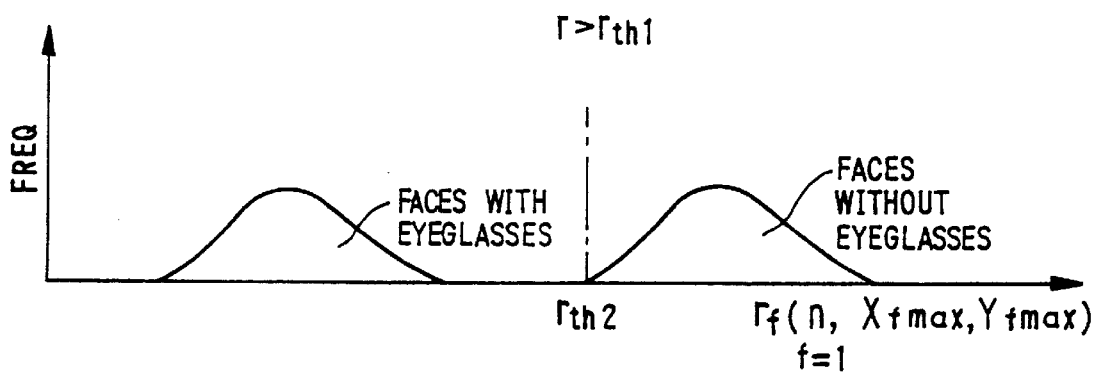

Next, the feature point position determining section 110 determines the matching position $(X_{max}, Y_{max})$ exhibiting the maximal similarity degree in the same manner as described hereinabove. When the partial regions containing feature points are matched against the partial dictionary images in the partial matching section 502, the frequency distributions of the partial region similarity degree $r_f(n, X_{fmax}, Y_{fmax})$ in the case where $r > r_{th1}$ will be as shown in FIG. 12E, for example. Thus, utilizing the partial region similarity degree $r_f(n, X_{fmax}, Y_{fmax})$, the decision section 902 is able to decide from FIG. 12E that the subject person is a person with no eyeglasses on when $r_f(n, X_{fmax}, Y_{fmax}) > r_{th2}$.

As described above, according to the embodiment of FIG. 11, objects of different categories having narrow differences that cannot be definitely distinguished by the whole region matching technique alone can be properly discriminated by utilizing the partial region matching.

The embodiment of FIG. 11 can further be expanded to a more general discriminating system by theoretically integrating the categories concerned. By way of example, assuming that the categories concerned are the male face i=1, the female face i=2 and the person with sunglasses on i=3, it would be possible to discriminate between human faces (i=1 OR i=2) by combining the apparatus for deciding whether or not the object belongs to the category i=1 and the apparatus for deciding whether or not the object belongs to the category i=2. Likewise, it would be possible to discriminate male faces with sunglasses on (i=1 AND i=3) by combining the apparatus for deciding whether or not the object belongs to the category i=1 and the apparatus for deciding whether or not the object belongs to the category i=3.

In this way, it is understood that this embodiment permits objects of different categories having small distinctions that cannot be definitely distinguished by the whole region matching to be correctly discriminated by the use of the partial region matching technique.

Figure 13:
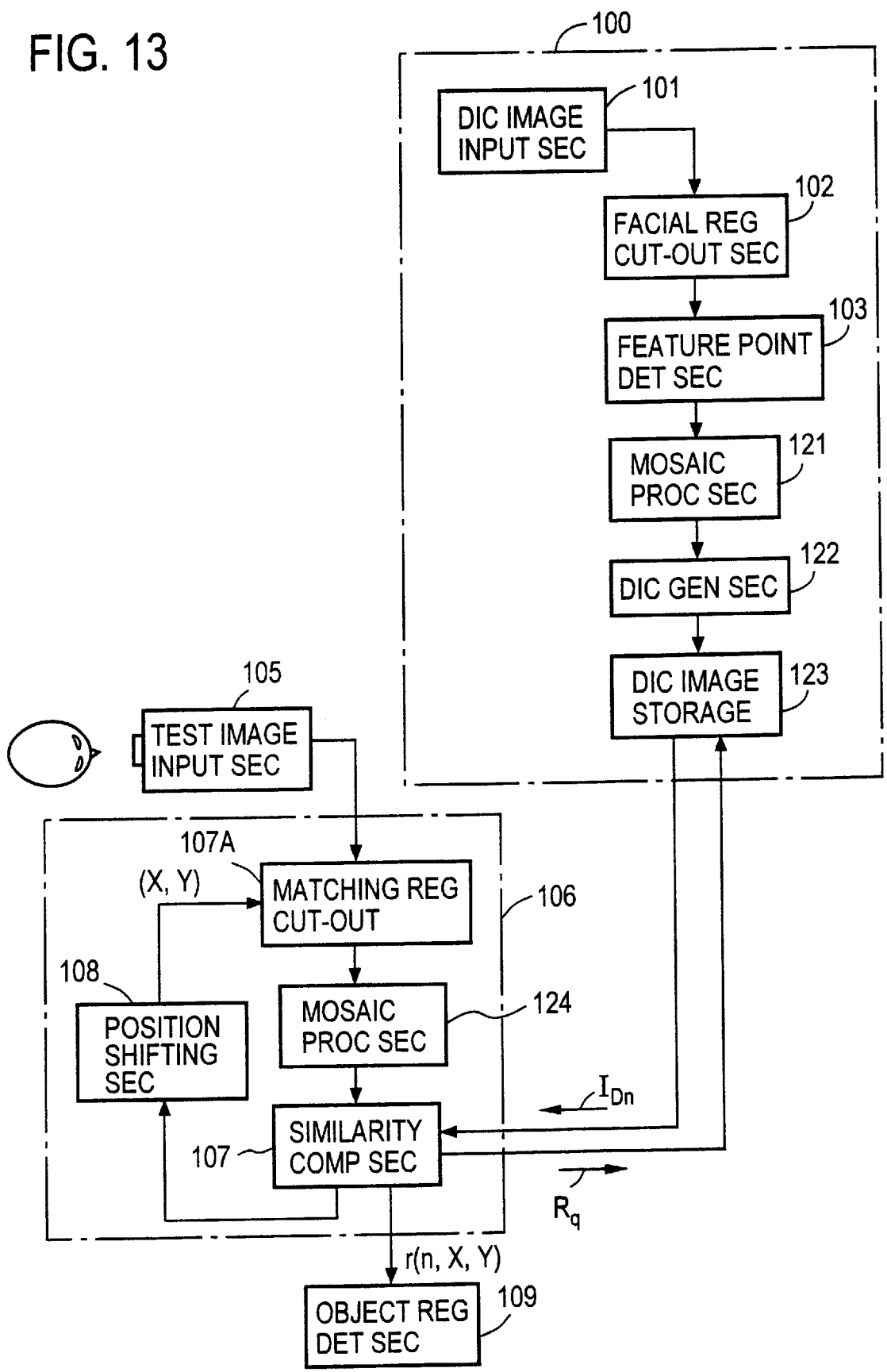
FIG. 13 is a functional block diagram showing a fifth embodiment of the present invention.

FIG. 13 shows a modified version of the embodiment of FIG. 1, in which like reference numerals are used for those blocks which correspond to blocks of the embodiment of FIG. 1. As in the embodiment of FIG. 1, facial images of persons belonging to any one of L categories in M directions or orientations are captured by the dictionary image input section 101 in the dictionary image generating section 100 and are cut into a desired size by the facial region cut-out section 102. The feature point positions ($x_f$, $y_f$) of the eyes and mouth of the cut out facial images are detected by the feature point detecting section 103, and the detected facial images are conformed for their sizes and positions in each of the M directions for each category by utilizing the positions ($x_f$, $y_f$) of the eyes and mouth, followed by being averaged. In this way, L×M averaged images are prepared.

Figures 14, 15:
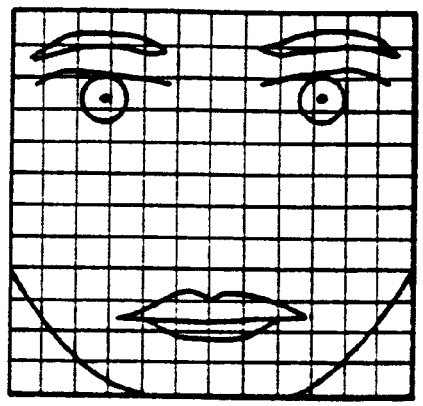
FIG. 14 is an illustration for explaining a mosaic process.
FIG. 15 is a table showing feature series of dictionary images.

In this embodiment, the dictionary image generating section 100 further comprises a mosaic processing section 121 for segmenting each of the averaged images into v×w blocks and averaging the pixel intensity within each block. This processing is called "mosaic processing" and mosaic-processed images are called "mosaic images." The series of mean intensity values of all blocks (v×w) of one mosaic image are called "a series of features" or "feature series" that constitutes a v×w-dimensional vectors. FIG. 14 illustrates an example in which an averaged image is divided into 12×12 blocks. In this case, the feature series is a 144-dimensional vector. The feature series of each averaged image is provided to a dictionary generating section 122.

Upon receiving M feature series $f_{i,m}$(m=1, 2, . . . , M) per each of given L categories, the dictionary generating section 122 prepares a table containing M feature series associated with individual codes i (i=1, 2, . . . , L) representing categories as shown in FIG. 15, and writes the table in a dictionary image storage 123.

The test image input section 105 takes an image and outputs it to the matching section 106 as a test image.

The matching section 106 comprises a mosaic processing section 124, in addition to the matching region cut-out section 107A, similarity computing section 107 and position shifting section 108 similar to those of the embodiment of FIG. 1. The mosaic processing section 124 performs a function similar to that performed by the mosaic processing section 121 in the dictionary generating section 100. Upon receiving a test image from the test image input section 105, the matching region cut-out section 107A cuts out of the test image a matching region image having a predetermined size at a matching position corresponding to the initial value ($X_0$, $Y_0$) provided by the position shifting section 108, and sends it to the mosaic processing section 124, which in turn mosaic-processes the received matching region image and provides the feature series of the processed image to the similarity computing section 107. Then the similarity computing section 107 requests the dictionary image storage 123 to read out dictionary images, receives successively N=L×M dictionary feature series (i.e. dictionary images), computes all the degrees of similarity r(n, $X_0$, $Y_0$) between the feature series of the test image and the feature series of each of the dictionary images to output the computed similarity degrees to the object region detecting section 109 while at the same time sending an instruction to update the matching position to the position shifting section 108.

As in the embodiment of FIG. 1, the position shifting section 108 updates the matching position and outputs an updated matching position (X, Y). The matching region cut-out section 107A cuts a matching region out of the test image at the updated matching position and outputs it to the mosaic processing section 124. The mosaic processing section 124 mosaic-processes the matching region image, computes the feature series for output to the similarity computing section 107, and computes the degrees of similarity r(n, X, Y) between the matching region in the test image and the dictionary images for output to the object region detecting section 109 while at the same time sending an instruction to update the matching position to the position shifting section 108. The foregoing processing steps are repeated until the matching position (X, Y) arrives at a preset position as explained with respect to FIG. 1, whereupon the processing by the matching section 106 is terminated, and the process proceeds to the object region detecting section 109. By way of example, the computation of similarity degrees r(n, X, Y) may be accomplished by utilizing reciprocals of a Euclidean distance between two feature series.

The object region detecting section 109 detects the matching position ($X_{max}$, $Y_{max}$) and the number n of the dictionary image when the received degree of similarity r(n, X, Y) becomes maximal as in the embodiment of FIG. 1.

According to the embodiment of FIG. 13, the matching region is divided into v×w=q blocks and subjected to the mosaic processing, so that the object detecting capability would become robust against errors in alignment and/or difference in size of the object region, and the computational quantity required for processings as a whole can be decreased, thus shortening required processing time. In addition, the memory capacity for storing the dictionary images can be reduced.

Figure 16:
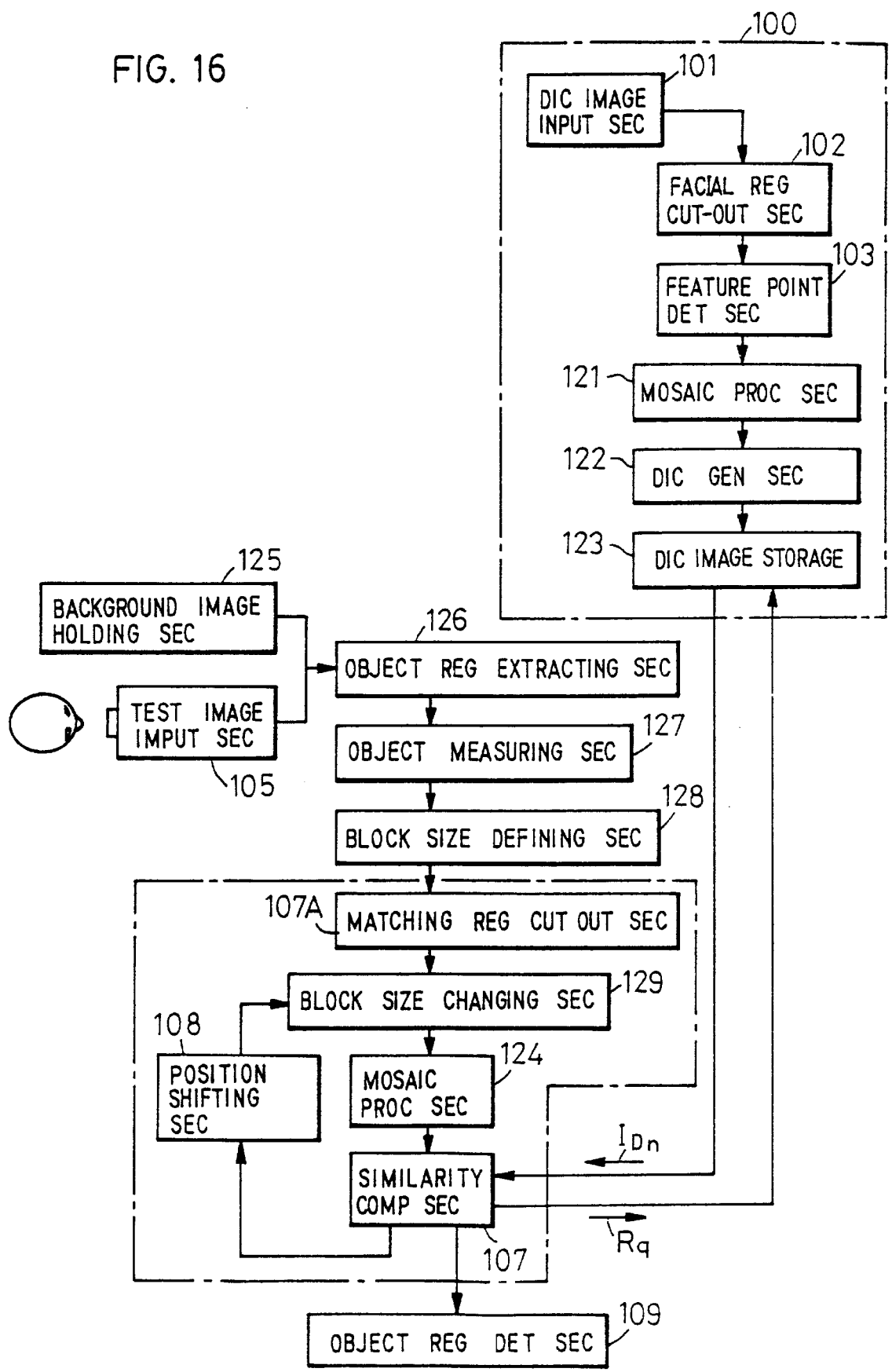
FIG. 16 is a functional block diagram showing a sixth embodiment of the present invention.

FIG. 16 shows a further modified version of the embodiment of FIG. 13. The processing by the dictionary image generating section 100 is generally identical to that of the embodiment of FIG. 13, and therefore the description thereon is omitted. In this embodiment, the system further comprises a background image holding section 125, an object region extracting section 126, an object measuring section 127, a block size defining section 128 and a block size changing section 129.

Figure 17:
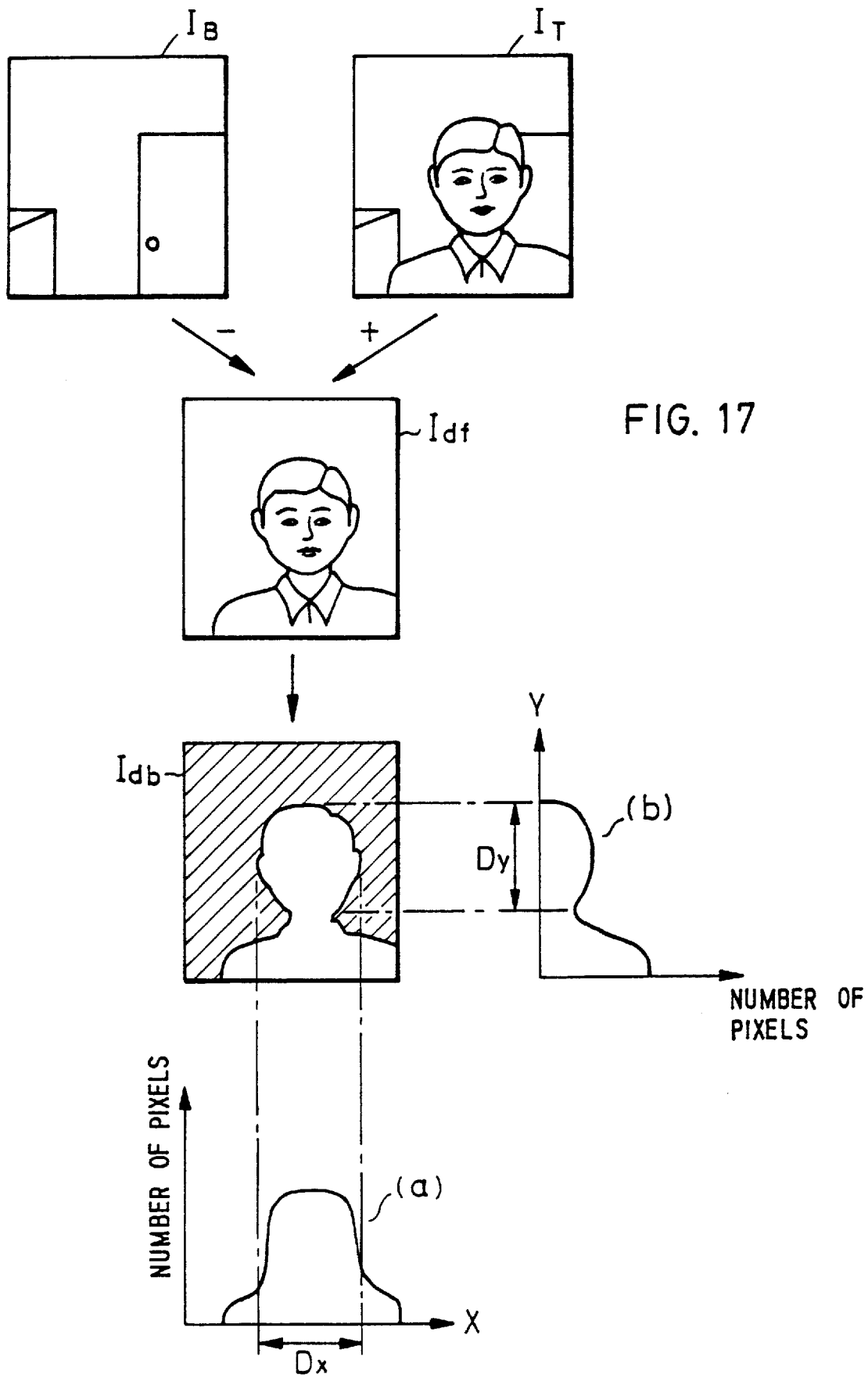
FIG. 17 is an illustration showing a process of extracting the scope of an object in the image.

The background image holding section 125 holds, as a background image, an image taken by the test image input section 105 a fixed time before the test image $I_T$ is taken in the same direction. As conceptionally illustrated in FIG. 17, the object region extracting section 126 effects subtraction between a test image $I_T$ from the test image input section 105 and a background image $I_B$ from the background image holding section 125 to produce a difference image $I_{df}$ and then binarizes all the pixel values of the difference image to generate a binary image $I_{db}$. In FIG. 17 it is assumed that the pixels in the human image region and the hatched background region are represented by "1" and "0", respectively. If the pixels of value "1" of this binary image $I_{db}$ are projected onto the X and Y axes, the distributions of the number of pixels on the respective axes are as shown in the form of graphs (a) and (b). The extent of the head of the human image and hence the dimensions Dx, Dy can be determined from the shapes of these distributions (a) and (b) as illustrated.

Based on the dimensions Dx, Dy, the block size defining section 128 may define the variable ranges of the dimensions of the v×w blocks as follows, assuming that the size of the actual object to be recognized is in the range from Dx−dx to Dx+dx in width or horizontal and from Dy−dy to Dy+dy in height or vertical:

Width: range from (Dx−dx)/v pixels to (Dx+dx)/v pixels

Height: range from (Dy−dy)/w pixels to (Dy+dy)/w pixels

If the number of pixels are not evenly divisible, they should be made integral numbers by rounding.

Upon receiving the test image from the test image input section 105, the similarity computing section 107 requests the dictionary image storage 123 to read out dictionary images, and receives dictionary feature series. The block size changing section 129 sets the block size at an initial value in the range defined by the block size defining section 128. The mosaic processing section 124, the similarity computing section 107, and the position shifting section 108 accomplish the same processing steps as described previously in connection with FIG. 13 until the mosaic processing and similarity computing steps at all the matching positions are completed, whereupon the block size is changed by a fixed width by the block size changing section 129 and the foregoing operations are repeated.

By detecting the approximate size of the object to be recognized as described above, it is possible not only to define the variable range of the block size and reduce the processing time but also to prevent the occurrence of errors in which a high similarity degree may be exhibited by chance between completely different sizes.

Figure 18:
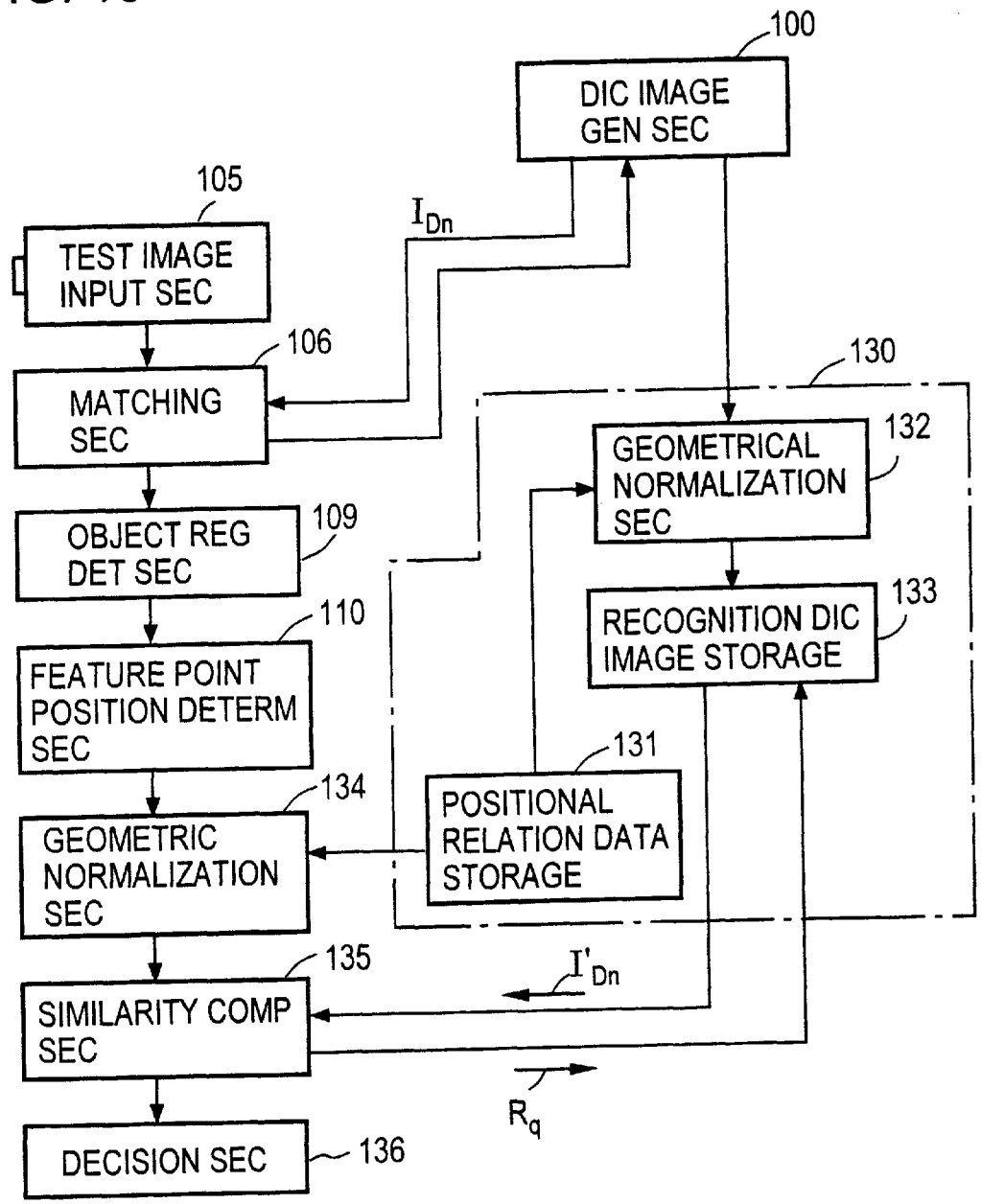
FIG. 18 is a functional block diagram showing a seventh embodiment of the present invention.

FIG. 18 shows still another embodiment in which dictionary images are geometrically normalized such that the feature points of each of the dictionary images will be in a predetermined positional relation therebetween and the test image is also geometrically normalized such that the positional relation between the feature points of the test image will be in coincidence with that between the feature points of the corresponding normalized dictionary image, whereby the matching accuracy may be enhanced. In this embodiment, an example is taken in which, as the feature points, the centroids of the left and right eye regions are extracted as $P_1$ and $P_2$ and the centroid of the mouth region is extracted as $P_3$, respectively. Included in this system is a recognition dictionary generating section 130 comprising a positional relation data storage 131, a geometrical normalization section 132 and a recognition dictionary image storage 133. On the side of the test image input section, a geometrical normalization section 134, a similarity computing section 135 and a decision section 136 are provided.

Figure 19A:
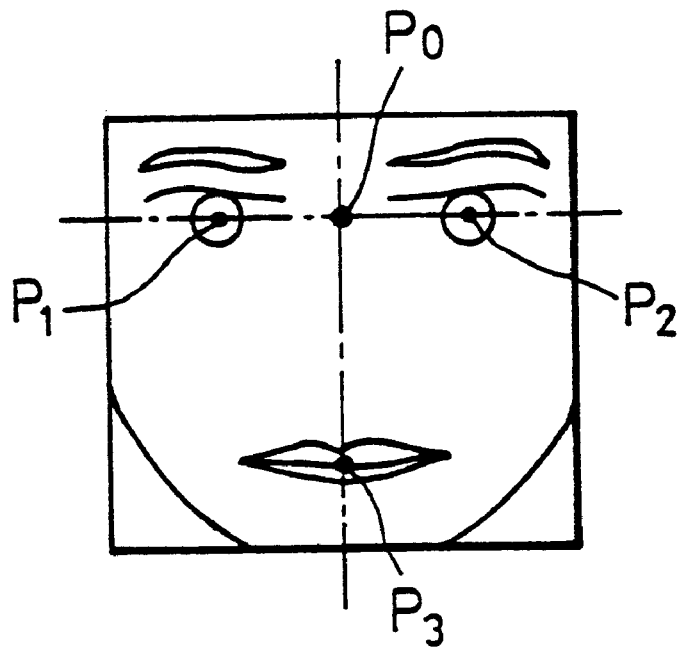
FIGS. 19A and 19B are illustrations showing relation between feature points.

The positional relation data storage 131 in the recognition dictionary generating section 130 has stored therein the positional relation of the feature points in an image taken in a predetermined basic direction. In this embodiment, stored in the storage 131 is the following positional relation between the three feature points $P_1$, $P_2$ and $P_3$ in the face viewed from the direct front thereof as shown in FIG. 19A, for example:

(1) the straight line connecting the points $P_1$ and $P_2$ being horizontal;

(2) the straight line connecting the middle point $P_0$ between $P_1$ and $P_2$ and the point P3 being vertical;

(3) the distance between $P_1$ and $P_2$; and (4) the distance between $P_0$ and $P_3$.

The geometrical normalization section 132 sends a readout request to the positional relation data storage 131 and receives a positional relation data of the feature points $P_1$, $P_2$, $P_3$ therefrom. Then, the geometrical normalization section 132 receives a dictionary image $I_{Dn}$ and corresponding positions $(x_f, y_f)$, f=1, 2, 3 of the feature points read out from the dictionary image storage 104 (see FIG. 1) of the dictionary image generating section 100, and applies a geometrical transform such as an affine transform to the dictionary image $I_{Dn}$ so that the positional relation of the feature points $(x_f, y_f)$, f=1, 2, 3 received from the dictionary image generating section 100 may coincide with the positional relation of the feature points $P_1$, $P_2$, $P_3$ read out from the positional relation data storage 131.

Figure 19B:
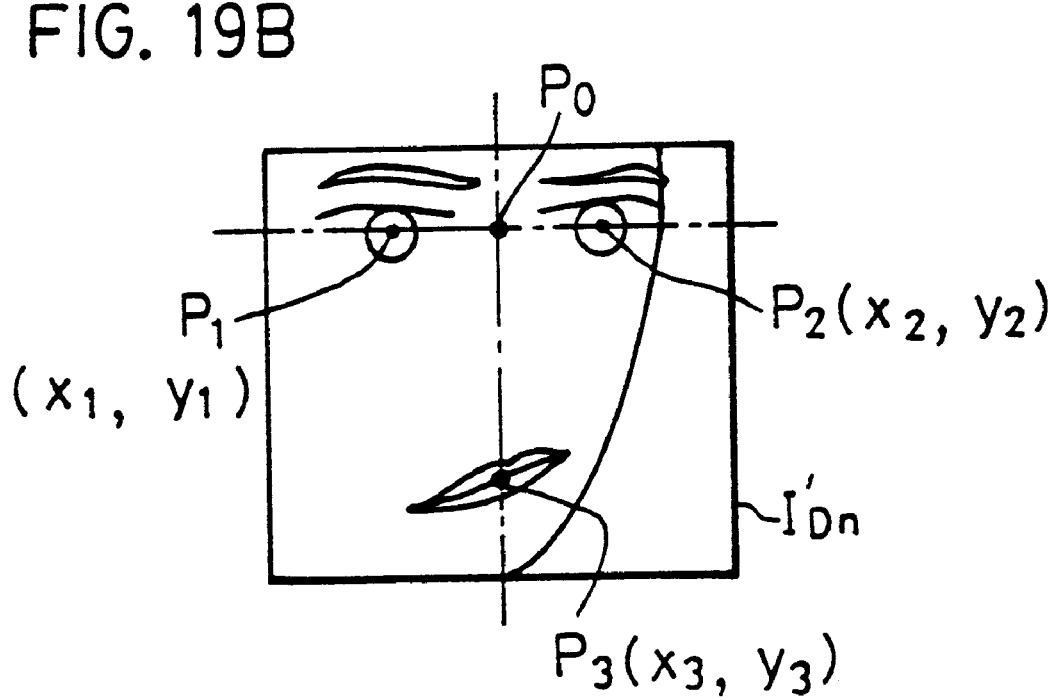

A matching region cut out of the thus transformed image data is stored as a recognition dictionary image $I'_{Dn}$ in the recognition dictionary image storage 133. This processing of the transform is repeated for all of the dictionary images $I_{Dn}$, n=1, 2, . . . , N, and the resultant images $I'_{Dn}$, n=1, 2, . . . , N, are stored in the storage 133. A rectangular region having a width a fixed number times as large as the distance between $P_1$ and $P_2$ and a length a fixed number times as large as the distance between $P_0$ and $P_3$ may be cut out as a matching region. An example of such a cut out matching region is shown in FIG. 19B.

As in the embodiment of FIG. 1, when a test image is inputted from the test image input section 105, the matching section 106 matches the test image against the dictionary image from the dictionary image generating section 100. On the basis of the results, the object region detecting section 109 detects the object region (here, a facial region) within the test image. And the feature point determining section 110 determines the positions $(X_f, Y_f)$, f=1, 2, 3 of feature points of the eyes and the mouth. The geometrical normalization section 134 applies an affine transform to the facial region image to bring the detected feature points into coincidence with the positional relation of the feature points $P_1$, $P_2$, $P_3$ stored in the positional relation data storage 131, and outputs the transformed facial region image $I'_{Dn}$ to the similarity computing section 135. The similarity computing section 135 reads recognition dictionary images successively out of the recognition dictionary image storage 133, and computes the degrees of similarity between the transformed facial region image in the test image and the dictionary images for output to the decision section 136. The computation of similarity degrees may be accomplished by utilizing coefficients of correlation between two matching region images, for example. The decision section 136 outputs as a decision result the category represented by the dictionary image exhibiting a maximal degree of similarity.

According to the embodiment of FIG. 18, the matching region of the test image is subjected to a geometrical transform so that the positional relation among the feature points extracted from the object region may coincide with a reference positional relation determined based on the basic direction of a reference object, and the similarity of thus transformed matching region image to the similarity transformed dictionary images is computed to detect an object region. Therefore, it is possible to accomplish detection of objects in various directions, sizes or shapes in the test images by using a relatively a small number of dictionary images, thus reducing the amount of processing required for object detection.

Figure 20:
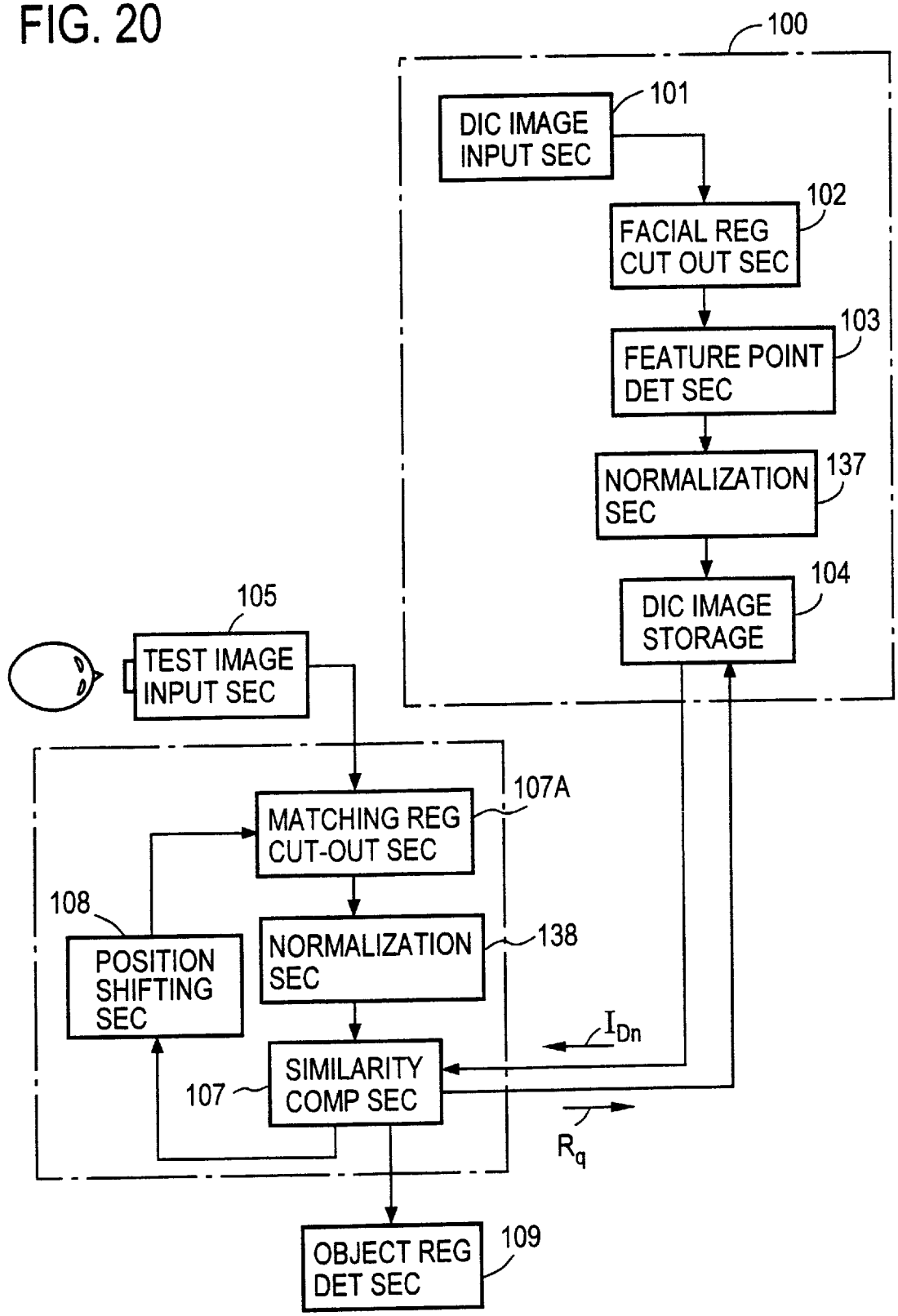
FIG. 20 is a functional block diagram showing a eighth embodiment of the present invention.

FIG. 20 illustrates a modified version of the embodiment of FIG. 1, in which the matching accuracy is enhanced by normalizing the brightness or lighting of the matching region in the test image and the dictionary image. The feature point determining section 110 may be omitted. In this embodiment, the dictionary image generating section 100 and the matching sections 106 are provided with brightness normalization section 137 and 138, respectively, which are adapted to normalize the brightness of the matching regions of the images received from the feature point detecting section 103 and the matching region cut-out section 107A, respectively. Brightness normalized dictionary images are thus written in the dictionary image storage 104. Likewise, the similarity computing section 107 is furnished with brightness normalized matching region images. The brightness normalization may be performed by transforming the intensity values of the respective pixels so that the mean value and variance of the intensity of pixels in the matching region may coincide with predetermined values. An alternative brightness normalization method is to convert, nonlinearly, the range between the maximum and minimum values of the intensity of pixels in the matching region to a range between predetermined maximum and minimum values. The system of this embodiment is otherwise similar to that of the FIG. 1 embodiment.

The dictionary image generating section 100 and the matching section 106 in the embodiment of FIG. 9 may also be provided with brightness normalization sections 137 and 138, respectively, as in the embodiment of FIG. 20.

According to the embodiment of FIG. 20, the matching region is converted so that mean and variance of the intensity of pixels in the object region may become a predetermined value, and the similarity of the converted image to each of the dictionary images is computed. Owing to this normalization processing, it is possible to prevent lowering of the matching accuracy when the brightness of the object in the test image varies with a change in pose of the object, for example.

As is described above, according to the present invention, images of an object or objects belonging to each of a predetermined number of categories are previously taken by a camera from predetermined M directions and N dictionary images representative of the respective combination of directions and categories are generated from the images thus obtained and the N dictionary images are stored. When a test image of an object to be analyzed is provided, the test image is matched at each position to the N dictionary images, and the position in the test image having the highest similarity to the dictionary image is detected whereby the object region in the test image is extracted, and also whether or not the object of the test image belongs to a particular category is determined from the degree of similarity at that time. Therefore, the object region can be extracted from the test image by a high speed processing and stably regardless of the direction or orientation of taking the image of the object and, in addition, it is possible to determine whether the object extracted belongs to a predetermined category (human face, child's face, adult female face or adult male face).

As an application of the present invention, a human image which was taken by cameras equipped with, for example, banking facilities is used as a test image of an object to be analyzed for the object image detecting system according to the present invention. In most banks cameras are triggered by an output signal of a pressure sensor mounted in automatic doors at an entrance and exit or a starting operation of an automatic teller machine by a human. Therefore, if such a human image is used as a test image of an object to be analyzed for the present system and the system is started with the category of human face, then it is possible to discriminate between a normal face (a customer) and a human whose face is covered with sunglasses or a mask (a doubtful person) and there can be realized a system for detecting a doubtful or suspicious character.

Also, the present invention is applicable to a market survey system for analyzing what things persons are interested in by inputting images of the persons passing by a shopping area or street or images of the persons seeing show windows into the object image detecting system, providing, as categories to be determined by this system, male face, female face, persons with eyeglasses on and the like and classifying the persons of test images into corresponding categories stated above.

What is claimed is:

1. A method for detecting a face image in an input test image as a face region by matching each of successive regions of said input test image with dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, . . . , N, and N=L×M, said method comprising the steps of:

(a) updating a matching position (X,Y) of said input test image and outputting said updated matching position (X,Y);

(b) cutting out, as a matching region image, an image of a region of a predetermined size on the basis of said matching position (X,Y) in said input test image;

(c) computing a degree of similarity r(n) between said matching region image and an n-th dictionary image;

(d) repeating the computation of said degree of similarity r(n) with said matching position (X,Y) and said n varied thereby obtaining the degree of similarity r(n) between said matching region image and each of respective dictionary images of said L categories and M directions;

(e) detecting said face region in said test image by obtaining the matching position where said degree of similarity obtained by said step (d) becomes the maximum as a face position (Xmax, Ymax); and (f) comparing said degree of similarity r(n) with a predetermined threshold value to determine, based on the comparison, whether or not the face image in said test image belongs to at least one of said categories;

wherein each said dictionary image is generated as a series of dictionary block image information consisting of q pieces of block image information, each composed of a representative pixel value of a corresponding one of q blocks obtained by dividing the matching region in the image of said reference face into w pieces in a longitudinal direction and v pieces in a lateral direction, where q=v×w, and wherein said step of computing the degree of similarity is a step of generating a series of test block image information consisting of q pieces of block information, each composed of a representative pixel value of a corresponding one of q blocks obtained by dividing said matching region at the matching position (X,Y) in said test image into w pieces in the longitudinal direction and v pieces in the lateral direction and computing the degree of similarity between the series of test block image information and the n-th series of dictionary block image information as the degree of said similarity r(n).

2. The method according to claim 1, wherein the number of pixels composing each of said q=v×w blocks is limited within a predetermined range.

3. The method according to claim 1, wherein said step of generating said series of q pieces of test block image information includes:

a step of holding, as a background image, an input image taken a fixed time before said input test image is taken in the same direction;

a step of producing a difference image between a present input test image and said background image;

a step of obtaining a size of a face region based on said difference image;

a step of determining a range of block size based on said size of the face region; and a step of repeating the processing for computing the degree of similarity for each block size varied a fixed width step by step from an initial value within said range of the block size.

4. A method for detecting a face image in an input test image as a face region by matching each of successive regions of said input test image with dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, ..., N, and N=L×M, said method comprising the steps of:

(a) updating a matching position (X,Y) of said input test image and outputting said updated matching position (X,Y);

(b) cutting out, as a matching region image, an image of a region of a predetermined size on the basis of said matching position (X,Y) in said input test image;

(c) computing a degree of similarity r(n) between said matching region image and an n-th dictionary image;

(d) repeating the computation of said degree of similarity r(n) with said matching position (X,Y) and said n varied thereby obtaining the degree of similarity r(n) between said matching region image and each of respective dictionary images of said L categories and M directions;

(e) detecting said face region in said test image by obtaining the matching position where said degree of similarity obtained by said step (d) becomes the maximum. as a face position (Xmax, Ymax); and (f) comparing said degree of similarity r(n) with a predetermined threshold value to determine, based on the comparison, whether or not the face image in said test image belongs to at least one of said categories;

wherein said step of obtaining the degree of similarity includes transforming the intensity of each pixel so that mean and variance of the intensity of pixels within a matching region of each matching region image and dictionary image become predetermined values, respectively, and obtaining the degree of similarity of the transformed matching region image and the transformed dictionary image.

5. A method for detecting a face image in an input test image as a face region by matching each of successive regions of said input test image with dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, ..., N, and N=L×M, said method comprising the steps of:

(a) updating a matching position (X,Y) of said input test image and outputting said updated matching position (X,Y);

(b) cutting out, as a matching region image, an image of a region of a predetermined size on the basis of said matching position (X,Y) in said input test image;

(c) computing a degree of similarity r(n) between said matching region image and an n-th dictionary image;

(d) repeating the computation of said degree of similarity r(n) with said matching position (X,Y) and said n varied thereby obtaining the degree of similarity r(n) between said matching region image and each of respective dictionary images of said L categories and M directions;

(e) detecting said face region in said test image by obtaining the matching position where said degree of similarity obtained by said step (d) becomes the maximum as a face position (Xmax, Ymax);

(f) comparing said degree of similarity r(n) with a predetermined threshold value to determine, based on the comparison, whether or not the face image in said test image belongs to at least one of said categories;

(g) cutting out, as one of said dictionary images, an image of a predetermined matching region from each of the images of said reference faces belonging to said L categories taken from said M directions;

(h) storing the position $(x_f, y_f)$ of F feature points $P_f$, F being an integer of value one or greater, in each of said dictionary images corresponding to each of said dictionary images into a dictionary image storage means;

(i) superimposing the dictionary image having a highest degree of similarity on said face position $(X_{max}, Y_{max})$ in said test image, converting the position of said feature point corresponding to said dictionary image into the position $(X_f, Y_f)$ in said test image and outputting the converted position;

(j) cutting out a region of the face image to be recognized in said test image as the matching region;

(k) storing in positional relation storage means the positional relation between feature points extracted from an image obtained when said reference face is taken from a basic direction;

(l) extracting feature points from matching regions of said dictionary image and said test image, respectively;

(m) geometrically transforming the matching regions of an n-th dictionary image and said test image so that the positional relation between the feature points of said test image coincides with the positional relation stored in said positional relation storage means; and (n) computing the degree of similarity r(n) between said geometrically transformed matching regions of said test image and said n-th dictionary image.

6. The method according to claim 1, 4 or 5, further including the step of selecting one of the categories which provides a maximum of said degree of similarity r(n), thereby determining the one of the categories to which the face image in said test image belongs.

7. The method according to claim 1, 4 or 5, further including the steps of:

generating a partial dictionary image from a predetermined region including said feature point $P_f$ in each of said dictionary images $I_{Dn}$, where n=1, 2, ..., N, and storing said partial dictionary image together with said number n and said position $(x_f, y_f)$ in said dictionary image in partial dictionary image storage means;

computing, as a partial matching processing, the degree of similarity $r_f$ between a region around the position $(X_f, Y_f)$ of said feature point $P_f$ in said test image and said partial dictionary image generated from said n-th dictionary image when said test image is given; and performing said partial matching processing with the matching position (X, Y) varied, defining the position where the degree of similarity $r_f$ becomes the highest as the optimum position $(X_{fmax}, Y_{fmax})$ of said feature point $P_f$, and outputting said optimum position for each feature point.

8. The method according to claim 7, further including the step of determining to which one of the categories the face image in said test image belongs based on the degree of similarity r(n) between said object in said test image and the dictionary image and the degree of similarity $r_f$ between said face image in said test image and the partial dictionary image.

9. A system for detecting a face image in an input test image as a face region comprising:
dictionary image storage means for storing dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, . . . , N, and N=L×M;
position shift means for updating a matching position (X,Y) of said input test image and outputting said updated matching position (X,Y);
matching region cut-out means for cutting out, as a matching region image, an image of a region of a predetermined size on the basis of said matching position (X,Y) in said input test image;
similarity computing means for computing the degree of similarity r(n) between said matching region image and an n-th one of said dictionary images;
face region detecting means for repeating the computation of said degree of similarity r(n) with said matching position (X,Y) and said n varied, respectively, thereby obtaining the degrees of similarity r(n) between said matching region image and each of respective dictionary images of L categories and M directions and for detecting the face region in said test image by obtaining the matching position where said degree of similarity becomes maximum as a face position $(X_{max}, Y_{max})$; and
decision means for determining whether or not the face image in said test image belongs to at least one of said categories based on said degree of similarity r(n) between said face image in said test image and the dictionary images representative of at least one of the categories, said decision means including means for comparing the degrees of said similarity r(n) with a predetermined threshold value and determining, based on the comparison, whether the face image in said test image belongs to said one of the categories;
wherein each said dictionary image is stored in said dictionary image storage means as a series of dictionary block image information consisting of q pieces of block image information, each composed of a representative pixel value of a corresponding one of q blocks obtained by dividing the matching region in the image of said reference face into w pieces in a longitudinal direction and v pieces in a lateral direction, where q=v×w, and wherein said similarity computing means includes means for generating a series of test block image information consisting of q pieces of block information, each composed of a representative pixel value of a corresponding one of q blocks obtained by dividing said matching region at the matching position (X,Y) in said test image into w pieces in said longitudinal direction and v pieces in said lateral direction and computing the degree of similarity between the series of test block image information and the n-th series of dictionary block image information as the degree of similarity r(n).

10. The system according to claim 9, wherein there is provided means for limiting the number of pixels composing each of q=v×w said blocks within a predetermined range.

11. A system for detecting a face image in an input test image as a face region comprising:
dictionary image storage means for storing dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, . . . , N, and N=L×M;
position shift means for updating a matching position (X,Y) of said input test image and outputting said updated matching position (X,Y);
matching region cut-out means for cutting out, as a matching region image, an image of a region of a predetermined size on the basis of said matching position (X,Y) in said input test image;
similarity computing means for computing the degree of similarity r(n) between said matching region image and an n-th one of said dictionary images;
face region detecting means for repeating the computation of said degree of similarity r(n) with said matching position (X,Y) and said n varied, respectively, thereby obtaining the degrees of similarity r(n) between said matching region image and each of respective dictionary images of L categories and M directions and for detecting the face region in said test image by obtaining the matching position where said degree of similarity becomes maximum as a face position $(X_{max}, Y_{max})$; and
decision means for determining whether or not the face image in said test image belongs to at least one of said categories based on said degree of similarity r(n) between said face image in said test image and the dictionary images representative of at least one of the categories, said decision means including means for comparing the degrees of said similarity r(n) with a predetermined threshold value and determining, based on the comparison, whether the face image in said test image belongs to said one of the categories;
said system further including brightness normalization means for transforming the intensity of each pixel so that mean and variance of the intensity of pixels within the matching region of each of said matching region image and said dictionary image become predetermined values, respectively, and obtaining the degree of similarity of the transformed matching region image and the transformed dictionary image.

12. The system according to claim 9, wherein said decision means determines whether the face image in said test image belongs to either one of two categories on the basis of the degree of similarity r(n) between the face image in said test image and dictionary images representative of said two categories.

13. A system for detecting a face image in an input test image as a face region comprising:
dictionary image storage means for storing dictionary images $I_{Dn}$ which are produced from images obtained by taking images of reference faces belonging to L categories from predetermined M directions, where L is an integer equal to one or greater, M is an integer equal to two or greater and is so selected that an angle between two adjacent directions from which images of said references faces are taken is equal to or greater than 10° and no greater than 40°, and n=1, 2, . . . , N, and N=L×M;

position shift means for updating a matching position (X,Y) of said input test image and outputting said updated matching position (X,Y);

matching region cut-out means for cutting out, as a matching region image, an image of a region of a predetermined size on the basis of said matching position (X,Y) in said input test image;

similarity computing means for computing the degree of similarity r(n) between said matching region image and an n-th one of said dictionary images;

face region detecting means for repeating the computation of said degree of similarity r(n) with said matching position (X,Y) and said n varied, respectively, thereby obtaining the degrees of similarity r(n) between said matching region image and each of respective dictionary images of L categories and M directions and for detecting the face region in said test image by obtaining the matching position where said degree of similarity becomes maximum as a face position ($X_{max}$, $Y_{max}$); and decision means for determining whether or not the face image in said test image belongs to at least one of said categories based on said degree of similarity r(n) between said face image in said test image and the dictionary images representative of at least one of the categories, said decision means including means for comparing the degrees of said similarity r(n) with a predetermined threshold value and determining, based on the comparison, whether the face image in said test image belongs to said one of the categories;

wherein said decision means determines whether the face image in said test image belongs to either one of two categories on the basis of the degree of similarity r(n) between the face image in said test image and dictionary images representative of said two categories; and wherein said dictionary image storage means stores therein the position ($x_f$, $y_f$) of F feature point $P_f$ in each of said dictionary images in correspondence therewith, F being an integer equal to or greater than one, said system further including:

feature point position detecting means for superimposing the dictionary image having the highest degree of similarity on said face position ($X_{max}$, $Y_{max}$) in said test image, converting the position of said feature point corresponding to said dictionary image into the position ($X_f$, $Y_f$) in said test image and outputting the converted position;

matching region cut-out means for cutting out a region of the face image to be recognized in said test image as the matching region;

positional relation storage means for storing therein the positional relation between feature points extracted from an image obtained when said reference object is taken from a basic direction;

feature point detecting means for extracting feature points from the matching regions of said dictionary image and said test image, respectively; and geometrical normalization means for geometrically transforming the matching regions of an n-th dictionary image and said test image so that the positional relation between the feature points of said test image coincides with the positional relation stored in said positional relation storage means.

14. The system according to claim 13, further including:

partial dictionary means for generating a partial dictionary image from a predetermined region including said feature point $P_f$ in each of said dictionary images $I_{Dn}$, where n=1, 2, . . . , N, and storing therein said partial dictionary image together with said number n and said position ($x_f$, $y_f$) in partial dictionary image storage means;

partial matching means for computing, as partial matching processing, the degree of similarity $r_f$ between a region around the position ($X_f$, $Y_f$) of said feature point $P_f$ in said test image and said partial dictionary image generated from the n-th dictionary image when said test image is given; and high precision feature point position determining means for performing said partial matching processing with the matching position (X, Y) varied, defining the position where the degree of similarity $r_f$ becomes the highest as the optimum position ($X_{fmax}$, $Y_{fmax}$) of said feature point $P_f$, and outputting said optimum position for each feature point.

15. The system according to claim 14, further including decision means for determining to which one of the categories the face image in said test image belongs on the basis of said degree of similarity r(n) between said face image in said test image and the dictionary image and said degree of similarity $r_f$ between said face image in said test image and the partial dictionary image.

16. The system according to claim 9, 11 or 13, further including decision means for selecting one of the categories which provides a maximum of said degree of similarity r(n) between said face image in said test image and the dictionary image, thereby determining the one of the categories to which the face image in said test image belongs.

* * * * *